United States Patent
Grassia et al.

(10) Patent No.: US 10,105,002 B2
(45) Date of Patent: Oct. 23, 2018

(54) IMPROVEMENTS TO COFFEE GRINDER

(71) Applicant: Breville Pty Limited, Alexandria (AU)

(72) Inventors: Robert Grassia, Summer Hill (AU); Daniel Robert Corkin, Panania (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 274 days.

(21) Appl. No.: 14/778,605

(22) PCT Filed: Apr. 8, 2014

(86) PCT No.: PCT/AU2014/000378
§ 371 (c)(1),
(2) Date: Sep. 20, 2015

(87) PCT Pub. No.: WO2014/165905
PCT Pub. Date: Oct. 16, 2014

(65) Prior Publication Data
US 2016/0051081 A1 Feb. 25, 2016

(30) Foreign Application Priority Data

Apr. 8, 2013 (AU) ................. 2013901192

(51) Int. Cl.
*A47J 31/40* (2006.01)
*A47J 31/44* (2006.01)
*A47J 31/24* (2006.01)
*A47J 31/42* (2006.01)

(52) U.S. Cl.
CPC ........... *A47J 31/4403* (2013.01); *A47J 31/24* (2013.01); *A47J 31/40* (2013.01); *A47J 31/404* (2013.01); *A47J 31/42* (2013.01); *A47J 31/4464* (2013.01)

(58) Field of Classification Search
CPC ........ A47J 31/4403; A47J 31/40; A47J 31/24; A47J 31/404; A47J 31/42; A47J 31/4464
USPC ............. 99/280, 286, 287, 295; 426/55, 231
See application file for complete search history.

(56) References Cited

U.S. PATENT DOCUMENTS

| | | | |
|---|---|---|---|
| 2,510,420 A * | 6/1950 | Ross ...................... | A23N 1/003 100/125 |
| 3,447,683 A * | 6/1969 | Luce, Jr. .................. | B03B 5/36 210/197 |
| 5,558,283 A | 9/1996 | Fisher et al. | |
| 2002/0027175 A1 * | 3/2002 | Capp ..................... | A47J 43/046 241/199.12 |

(Continued)

FOREIGN PATENT DOCUMENTS

| AU | 2012209041 A1 | 2/2013 |
| DE | 102010062180 A1 | 5/2012 |

(Continued)

OTHER PUBLICATIONS

International Search Report and Written Opinion for PCT/AU2014/000378, dated Sep. 22, 2014.

(Continued)

*Primary Examiner* — Thien S Tran
(74) *Attorney, Agent, or Firm* — Marshall, Gerstein & Borun LLP

(57) ABSTRACT

A tamping augur may be controlled in various ways to obtain a consistent fill height and uniformity in the distribution of coffee grinds in a portafilter. Improvements to a conical burr grinder are also disclosed.

13 Claims, 27 Drawing Sheets

(56) References Cited

U.S. PATENT DOCUMENTS

| | | | |
|---|---|---|---|
| 2010/0095852 A1* | 4/2010 | Remo | A47J 31/3614 |
| | | | 99/280 |
| 2010/0319155 A1* | 12/2010 | Boland | B60S 1/3882 |
| | | | 15/250.48 |
| 2011/0094391 A1 | 4/2011 | Erba et al. | |
| 2012/0196009 A1 | 8/2012 | Casado Gomez et al. | |
| 2013/0167729 A1* | 7/2013 | Hoare | A47J 31/44 |
| | | | 99/280 |

FOREIGN PATENT DOCUMENTS

| | | |
|---|---|---|
| EP | 1126774 B1 | 1/2003 |
| EP | 2107879 B1 | 6/2010 |
| EP | 2314182 A1 | 4/2011 |
| EP | 2314183 A1 | 4/2011 |
| WO | WO-2008/105017 A1 | 9/2008 |
| WO | 2009010190 A1 | 1/2009 |
| WO | WO-2012/045112 A1 | 4/2012 |
| WO | 2012084676 A1 | 6/2012 |

OTHER PUBLICATIONS

International Preliminary Report on Patentability for PCT/AU2014/000378, dated Oct. 13, 2015.

* cited by examiner

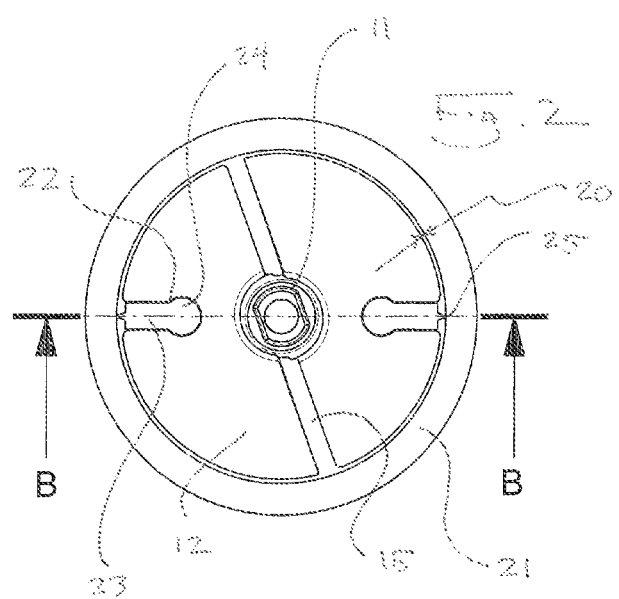
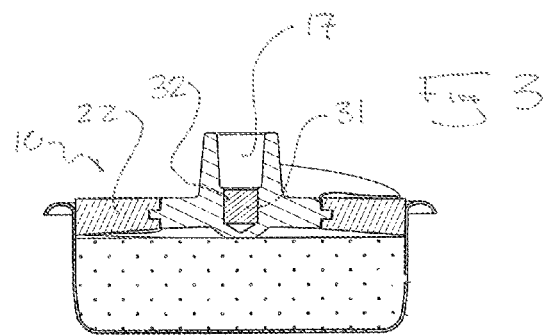

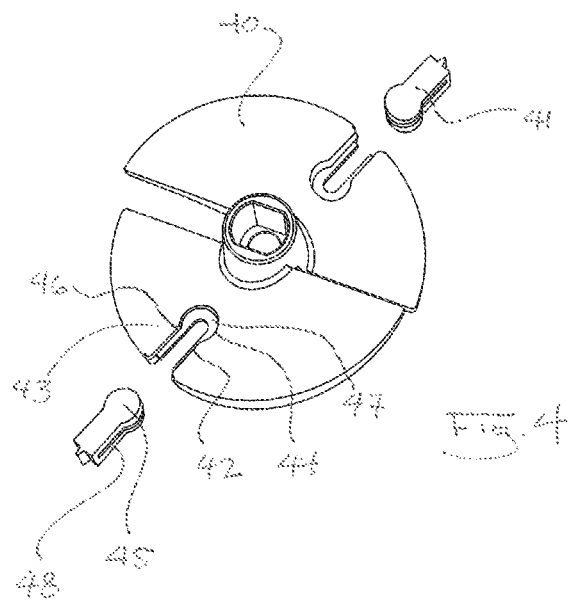

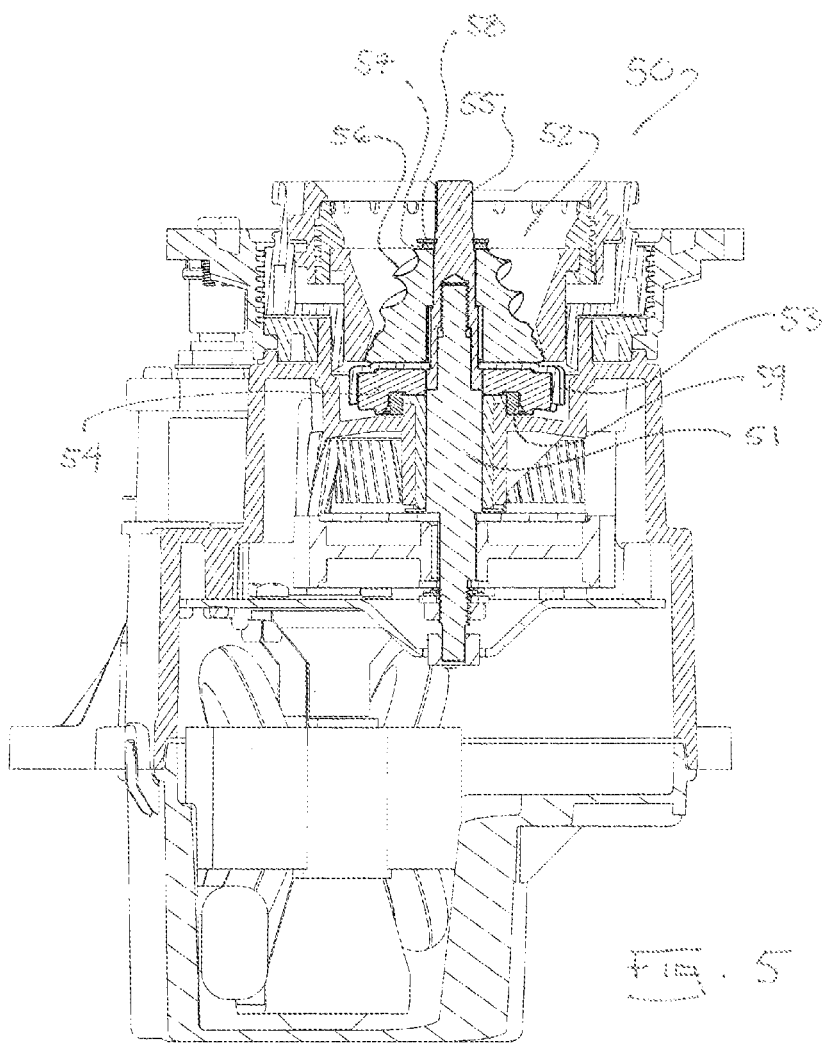

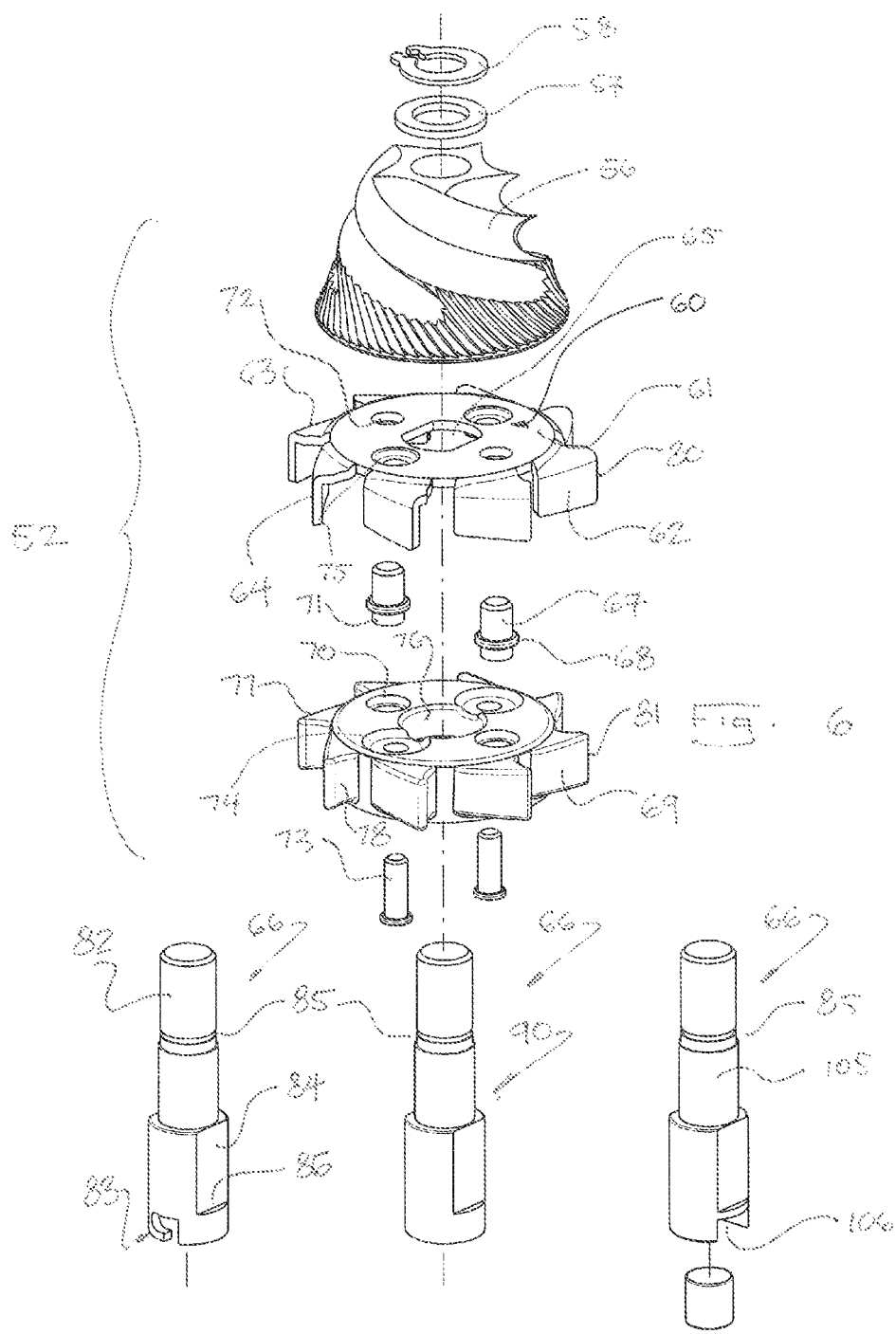

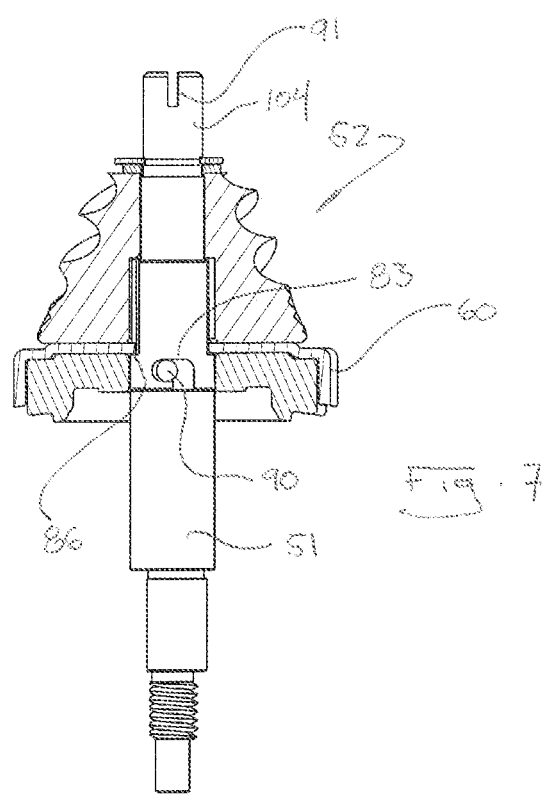

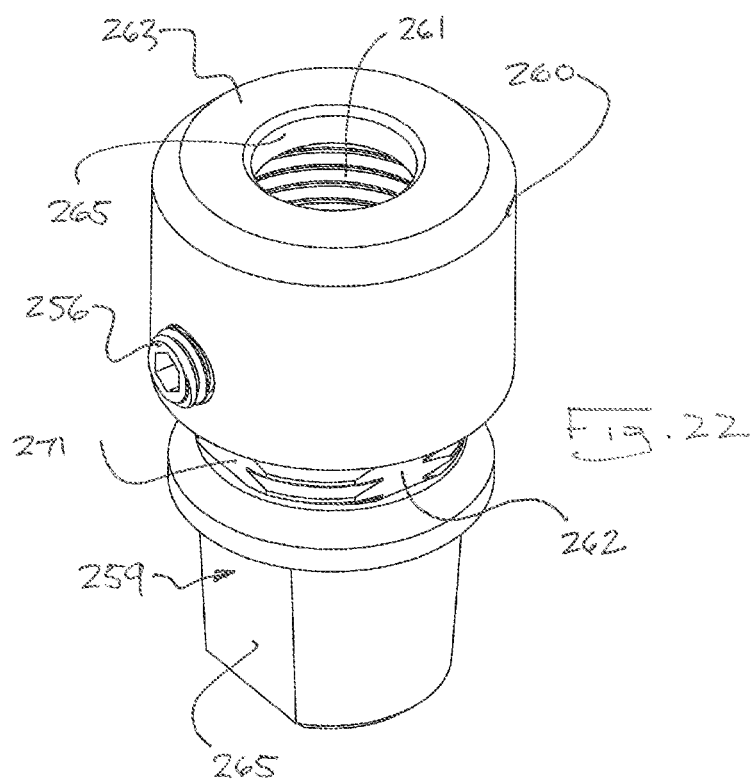

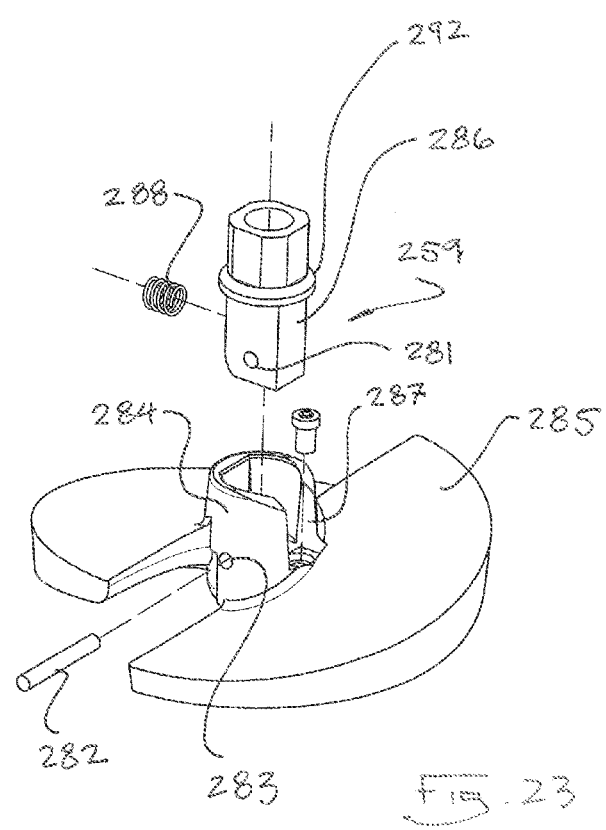

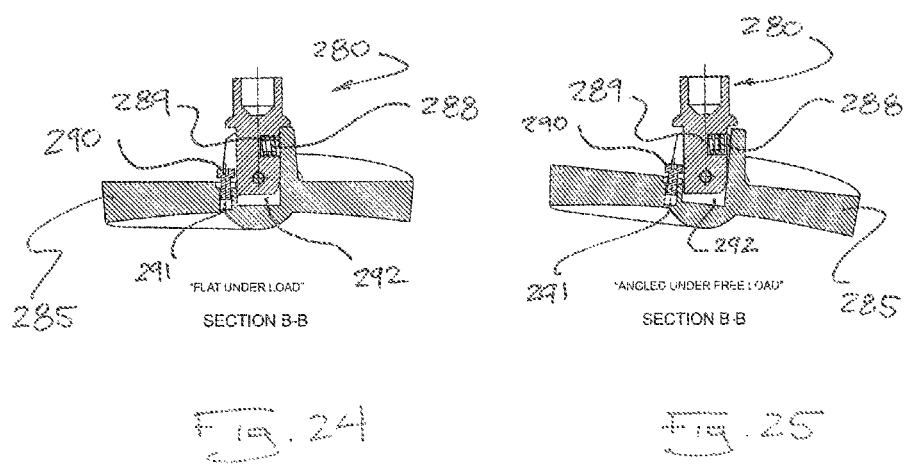

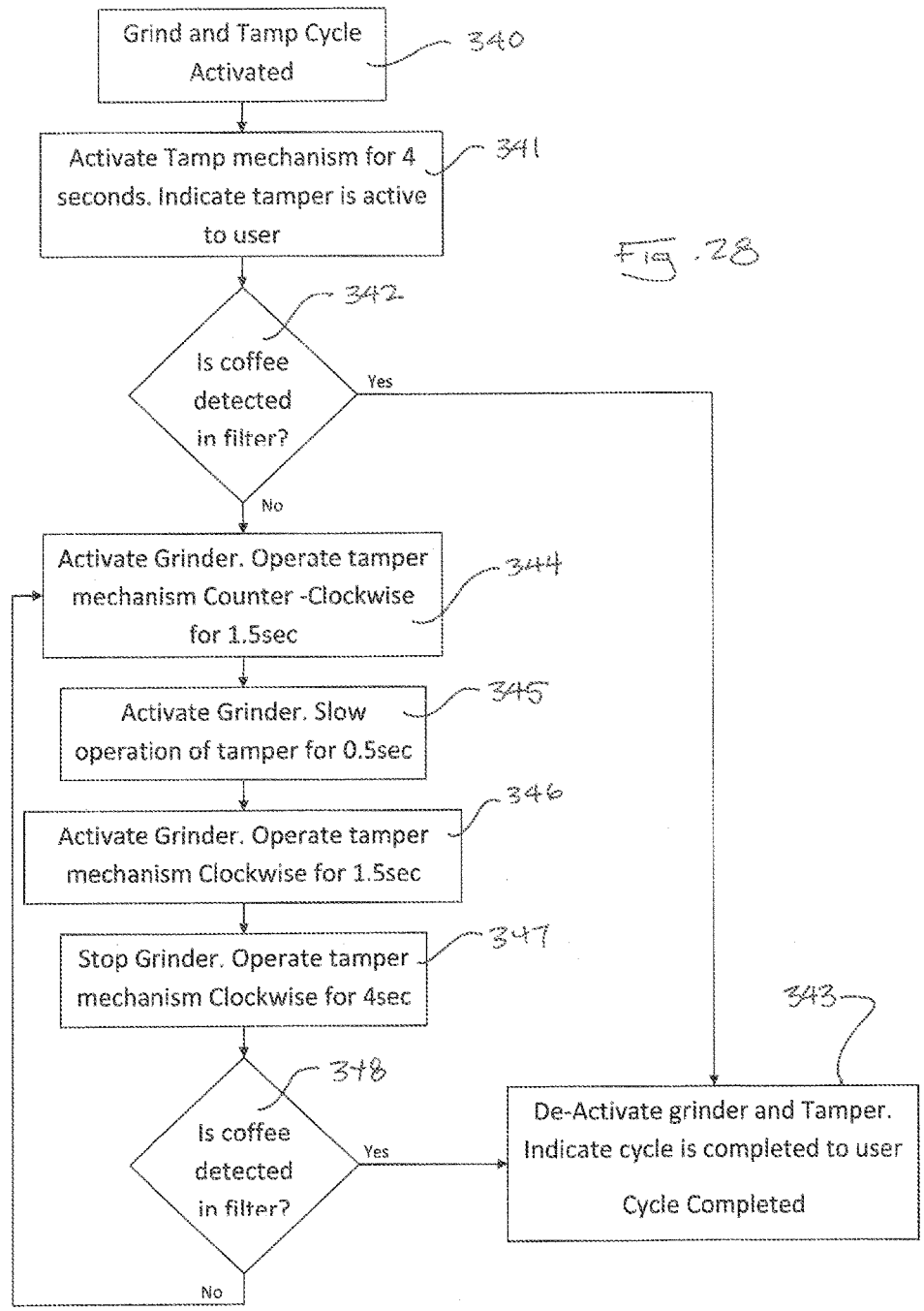

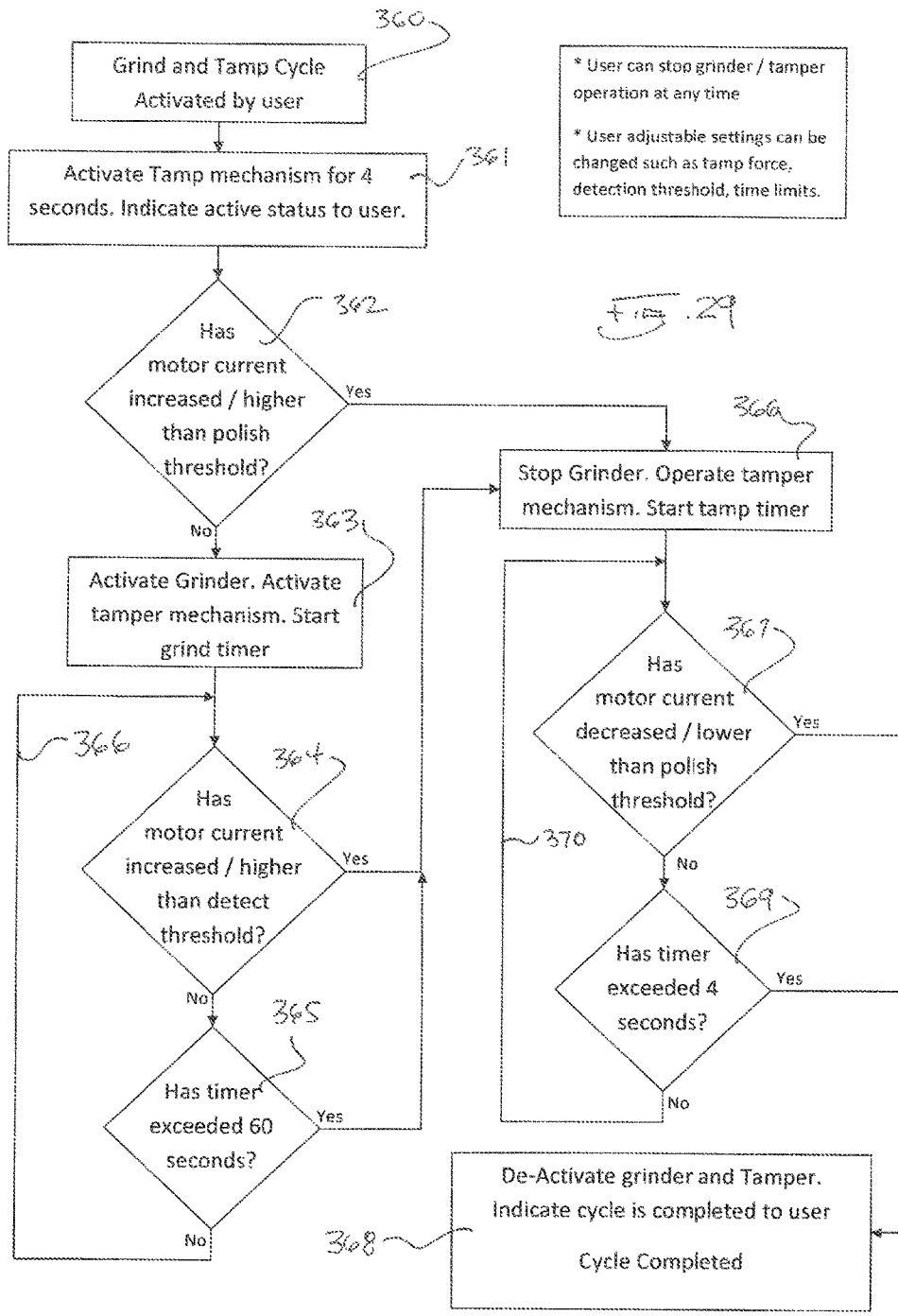

IMPROVEMENTS TO COFFEE GRINDER

FIELD OF THE INVENTION

The invention relates to coffee grinders and more particularly to conical burr grinders. More specifically, the invention addresses improvements to a tamping augur that may be associated with a coffee grinder.

BACKGROUND OF THE INVENTION

Conical burr coffee grinders are well known. It is possible for a conical burr grinder to require cleaning or maintenance to remove grind blockages. In order to disassemble a conical burr grinder for these purposes, typically the lower burr assembly including the conical shaped lower burr is removed from the grinder. In many instances, the lower burr assembly is secured by a nut. When the nut is removed, the lower burr and the related components in the assembly are removed individually. However, it can be difficult for a user to remove some of the small components associated with the lower burr assembly in the small and partially enclosed area of the grind chamber. Further, the user may be unfamiliar with a particular order of re-assembly, each of the components. In some instances, user will employ a vacuum cleaner to remove debris from the grind chamber. If the user has not removed all of the components, these may inadvertently be drawn into the vacuum cleaner. In some instances, the nut that secures the lower burr assembly is reverse threaded or may need a specific tool that can fit within the restricted space of the grind chamber.

A tamping augur comprises a rotating augur fan that fits within or otherwise cooperates with the filter basket of a portafilter. The augur fan of the tamping augur rotates within the filter basket to both compress the ground coffee in the filter basket and create a uniform upper surface. However, it is practically inevitable that there will be a clearance between the outer periphery of the augur fan and the inner wall of the filter basket. It is undesirable to have ground coffee attached to the inner wall of the filter basket above the level of the compacted grinds.

It is known to combine an espresso making machine with an integral coffee grinder. However, the tamping of the grinds into the portafilter requires skill. Users that do not possess this skill would benefit from a motorised tamping augur integrated with the coffee grinder. It would he additionally convenient to allow the grinder and augur to be operated by the action of the portafilter without resort to other user controls such as push buttons.

Boilers in an espresso coffee maker such as a steam generating boiler and a boiler for heating water for coffee accumulate scale during use. The extent of the scale depends on the hardness of the water being used. The accumulating scale degrades the performance and longevity of the boilers.

It is known to incorporate a conical burr grinder in an espresso machine. A conical burr grinder has an upper burr and a generally conically lower burr that forms a portion of a lower burr assembly. When the coffee grinder is dirty, obstructed or jammed, it may be necessary to remove the lower burr assembly from the grinder. This is often complicated, inconvenient or requiring special tools.

The performance of a motorised tamping augur can also be potentially improved by incorporating a height adjustment mechanism for the augur fan. In this way, inconsistencies in manufacturing and user preferences regarding the compaction height of a dose and portafilter may be user adjusted, as required.

Some tamping augurs also provide for less than uniform distribution and compaction of the grounds below augur fan, within the portafilter. Irregularities in the distribution of coffee grinds result in a less than optimal brew because water flowing through the portafilter will tend to bypass more compacted areas in favour of less compacted areas.

In an automated or semi-automated machine, methods and apparatus are also required for determining when a pre-established fill height or level of compaction has been reached with respect to the grinds in a portafilter.

Tamping augurs, augur heads such as fan type heads are disclosed in the Applicant's PCT application PCT/AU2011/001263.

OBJECTS AND SUMMARY OF THE INVENTION

It is an object of the technology to provide a conical burr grinder having a lower burr assembly that can be removed easily and intact It is another object of the technology to provide a lower burr assembly that is not retained by a nut or other fastener.

It is another object of the technology to provide an augur fan having one or more peripheral wipers.

It is yet another object of the technology to provide a coffee grinder having a lower burr assembly that is easy to remove.

It is a further object of the technology to provide a convenient way of de-scaling the boilers found in an espresso machine.

It is an additional object of the technology to provide a way of controlling a coffee grinder and tamping augur in an espresso machine using the interaction between a portafilter and a device that supports it during filling and tamping.

It is a further object of the technology to provide a tamping augur fan height adjustment mechanism.

It is yet a further object of the technology to provide an augur fan that pivots to an off-axis orientation initially and reverts to an orientation that is perpendicular to the rotation axis as the tamping load increases.

It is also an object of the technology to provide a motorised tamping augur with a height adjustable augur fan.

It is also another object of the technology to provide a coupling and spacer arrangement that may be interposed between a drive shaft and an augur fan.

It is also an object of the technology to provide a tamping augur assembly that reverses its direction of rotation in order to obtain uniformity in the distribution of coffee grinds within a portafilter.

It is also an additional object of the technology to provide a coffee machine or tamping augur assembly that is microprocessor controlled, the microprocessor obtaining a reduction in a current or load signal from a tamper augur's motor and comparing it to a pre-established threshold that is associated, directly or indirectly with the microprocessor ceasing the operation of the device's coffee grinder or tamper.

BRIEF DESCRIPTION OF THE DRAWING FIGURES

In order that the technology be better understood, reference is now made to the following drawing figures in which:

FIG. 2 is a top plan elevation of the augur fan depicted in FIG. 1.

FIG. 3 is a sectional view of a tamping augur fan within a filter basket of a portafilter as seen through line B-B of FIG. 2.

FIG. 4 is an exploded perspective view of an augur fan and its wiper blade inserts.

FIG. 5 is a cross sectional view of a coffee grinder incorporated into an espresso making machine.

FIG. 6 is an exploded perspective view of a lower burr assembly illustrating three different shaft variations.

FIG. 7 is a cross sectional view of a lower burr assembly incorporating a bayonet attachment feature.

FIG. 22 is a perspective view of a tamping augur height adjustment mechanism.

FIG. 23 is an exploded perspective view of a tamping augur fan with off-axis functionality.

FIG. 24 is a side elevation, cross sectioned to illustrate the augur fan depicted in FIG. 23.

FIG. 25 is a side elevation, cross sectioned to illustrate the augur fan depicted in FIG. 23.

FIG. 28 is a flow charge illustrating a way to operate a tamper in two different directions to achieve uniformity in the distribution of grinds in a portafilter.

FIG. 29 is a flow chart indicating a device and method for determining the proper filling of a portafilter by monitoring the current draw of the tamper augur's motor and comparing it to a pre-established threshold.

BEST MODE AND OTHER EMBODIMENTS

Figure 1:
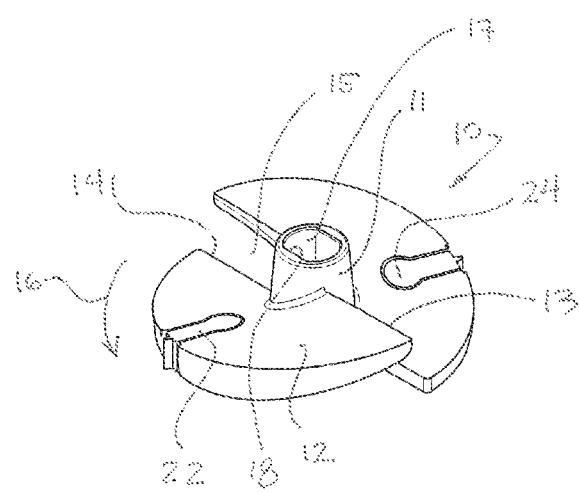
FIG. 1 is a perspective view of an augur fan with wiping blades.

As shown in FIG. 1, the fan or head 10 of a motorised tamping or compaction augur comprises a hub 11 from which radiates one or more tamping blades 12. In this example, there are two blades. Each blade is approximately semi-circular in plan view as shown in FIG. 2. The each blade has an approximately helical configuration, having a leading edge 13 higher in elevation than a trailing edge 14. There is a preferably parallel gap passage or other gap 15 between the blades that allow coffee grounds to fall between them from above. When the augur fan is rotated 16 the trailing edge 14 acts to compress the grounds beneath it and to smooth the surface of the tamped or compacted grounds below the fan. Tamping augurs, augur heads such as fan type heads are disclosed in the Applicant's PCT application PCT/AU2011/001263.

As illustrated in FIG. 2, there is a small gap 20 located between the outer periphery of the fan and the inside wall of the filter basket 21. The gap 20 can be effectively closed or reduced with the provision of wipers or replaceable wiper inserts 22 that are retained by the one or more blades, but not necessarily by each blade. In this example, each of the two blades carries a wiper insert 22. In preferred embodiments, the augur fan body is manufactured from a rigid polymer or a metal and the wiper inserts 22 are elastomeric.

As suggested by FIGS. 1-3, each wiper insert 22 comprises a flat body having parallel sides 23. The body has, at one end, an enlarged head 24. The other end of the body features a vertically aligned rib, lip or bead 25. The lip 25 projects beyond the outer periphery of the augur fan blade or body and extends so as to sweep or contact the inner wall of the filter basket 21. When the augur fan is rotated, the lip 25 acts to clear or wipe debris off of the inner wall of the filter basket.

In this example, the hub 11 has a central tapered bore 17. The central tapered bore 17 has one or more flat sides 18 for retaining the tapered lower end of the shaft that drives the augur fan. As shown in FIG. 3 the central tapered bore 17 may have a recess or pocket 31 at its lower end for receiving a magnet 32 that may be used to retain the augur fan 10 onto the augur fan's steel drive shaft.

A shown in FIG. 4, one way for the body of the augur fan 40 to retain the wiper inserts 41 is by providing an open ended recess 42 on the rim or outer edge of a blade that is adapted to receive the insert 41. In this example, the thickness of the insert 41 is approximately the same thickness as the augur fan blade in the area 43 surrounding the recess 42. Each recess comprises a terminal pocket 44 for receiving the enlarged head 45 of the insert. The recess 42 has parallel sides 46 for snugly receiving the parallel sides of the body of the insert. An internal, peripheral rib 47 within the recess cooperates with a corresponding peripheral slot 48 on the insert. Thus, the elastomeric insert 41 can be pushed into the recess and will be retained by compressive forces, friction and interference between the enlarged head 45 and the narrower gap formed between the parallel side walls 42 of the recess.

As shown in FIG. 5, a conical burr grinder 50 includes a motorised drive shaft 51 that engages with and rotates an upper burr assembly 52. In this example, the upper burr assembly includes a metallic impeller plate having an array of fins 53, an optional polymeric impeller support 54, a burr shaft 55 a lower burr 56, a washer 57 and a retainer or a circlip 58. In the example of FIG. 5, the lower burr assembly 52 is retained on the drive shaft 51 by a threaded interconnection between the drive shaft 51 and the internally threaded bore of the burr shaft 55. Other means of interconnecting the drive shaft 51 and the burr assembly 52 will be discussed below.

A felt washer or other seal 59 may be interposed between the impeller support and adjacent static parts of the grinder to prevent the infiltration of particulate matter into the area of the drive shaft 51.

As shown in FIG. 6, an impeller plate 60 has, in this example, a flat circular hub 61 from which radiates an array of protective blades or fins 62. Each blade or fin 62 has a horizontal portion 63 and a vertically extending portion 64. The hub 61 has a central opening 65 preferably provided with one or more flat sides so that the impeller blade may be driven or rotated by its burr shaft 66. Torque is transmitted from the impeller plate to the lower burr 56 by one or more lock pins 67. In this example, each locked pin 67 includes a peripheral flange 68 that facilitates trapping the lock pin 67 between the impeller plate 60 and the impeller support 69. The impeller support 69 may have openings 70 for receiving the lower end 71 of the lock pin, the openings 70 being rebated to receive the flange 68. Thus, the lock pins 67 project through openings 72 in the impeller plate 60 and in to cooperating openings (not shown) on the lower surface of the lower burr 56. The impeller plate 61 and impeller support 69 may be additionally fastened together with rivets 73 that pass from beneath the impeller support, through openings in the impeller support 74, continuing through openings 75 in the impeller plate. After insertion, the heads of the rivet 73 may be deformed into the rebated openings 75 on the upper surface of the hub 61.

The polymeric impeller support has a central through opening 76 for receiving the burr shaft 66. The impeller support also has thick integral blades or fins around its periphery. In this example, each blade or fin 77 has a concave front face 78. When the lower burr assembly rotates, the blades or fins 77 act to propel ground coffee out of the grind chamber. When assembled, the metallic fins or blades 62 covers, protects or of the impeller plate 60 overlie and protect the polymeric fins 69 on the impeller support. Accordingly, it is preferred that the outer most tip 80 of each metallic fin or blade 62 overlaps the outer tip 81 of each polymeric blade 77. This reduces wear on the impeller support, particularly in the area of the blade tips 81.

FIG. 6 also illustrates three different types of lower burr assembly shaft 66. A bayonet shaft 82 includes a component of a bayonet fastening 83 at a lower end. In this example, the bayonet fastening is the female component of a bayonet fastening. The lower part of the bayonet shaft 82 includes a pair of flat sides 84 that are intended to engage and drive the flat sides of the central bore 65 in the impeller plate 60. The bayonet shaft 82 also has a circumferential groove 85 for accommodating the circlip 58 that retains the lower burr 56. A projection 82 above the groove 85 act as a finger grip. Accordingly, the sub-assembly comprising the impeller support, impeller plate, lower burr and washer are trapped between the circlip 58 and a shoulder 86 located on a lower end of the burr shaft 66.

As shown in FIG. 7, the bayonet feature 83 at the lower end of the bayonet style burr shaft engages one or more radially extending retention pins 90 that extend away from the upper portion of the drive shaft 51. The shoulder 86 of the burr shaft can be seen abutting the lower surface of the impeller plate 60. Thus, the entire lower burr assembly 52 can be inserted, then disengaged from the drive shaft 51 by rotating the bayonet features 83, 90 into and out of engagement. The upper end of the burr shaft may be slotted 91 so as to admit a screw driver or other tool for causing the rotation required to engage and disengage the bayonet features 83, 90.

Figure 8:
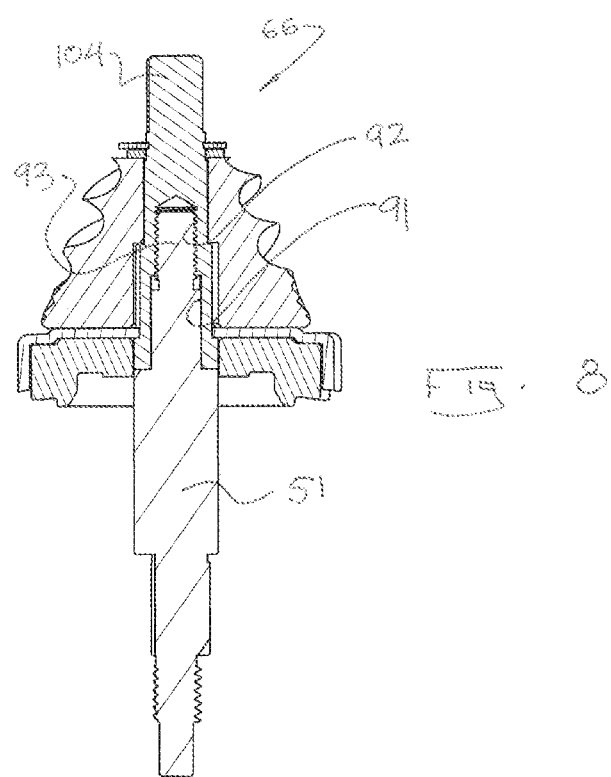
FIG. 8 is a cross sectional view of a lower burr assembly utilising a threaded interconnection between the lower burr shaft and its driving shaft.

As suggested by FIGS. 6 and 8, the burr shaft 66, 90 may have a central blind bore 91, the upper extent of which is threaded 92 to receive cooperating threads 93 formed on an upper extent of the drive shaft 51.

Figure 9:
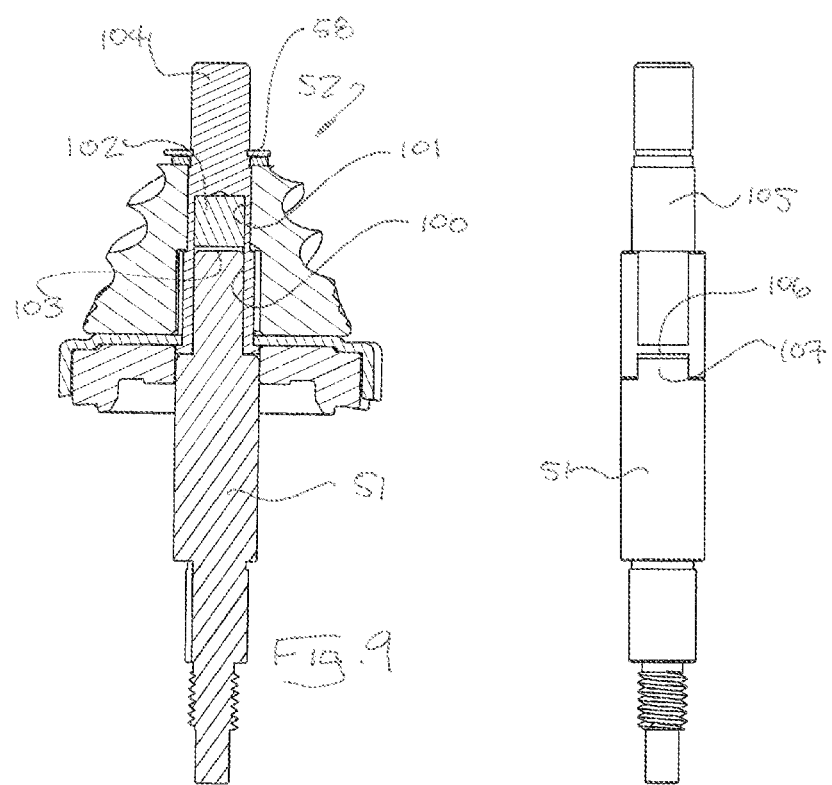
FIG. 9 is a cross sectional view of a lower burr assembly illustrating a magnet in the lower burr shaft.

As suggested by FIGS. 6 and 9, the lower burr assembly 52 may be retained on the burr shaft by magnetic attraction between the two. As shown in FIG. 9, the central blind bore 100 of the burr shaft may include a terminal pocket 101 for receiving a permanent magnet 102. The lower end of the magnet 102 is in close proximity to the upper end 103 of the drive shaft 51. Magnetic attraction thus prevents inadvertent lifting off of the burr assembly 52 from the drive shaft 51. As with each of the aforementioned examples, the burr shaft 66 includes and upper portion 104 that extends above the circlip 58 and the groove 85 that retains it. This extension 104 allows the user to grasp the burr assembly 52 and remove it from the drive shaft 51. The lower end of the magnetic style burr shaft 105, in this example, forms a saddle or channel 106 that is adapted to receive a one or more driving projections 107 formed on the draft shaft 51. In this way, torque is transmitted from the drive shaft 51 to the lower burr assembly shaft 105 through the projection 107 and saddle 106.

Figure 10:
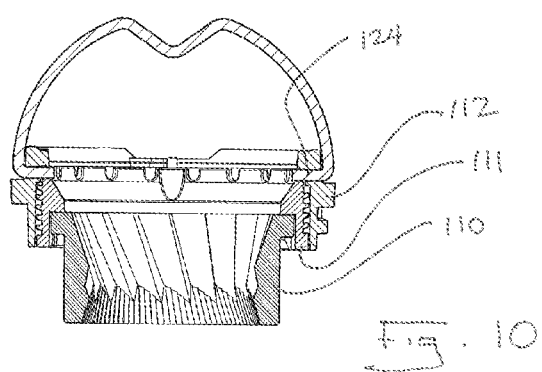
FIG. 10 is a cross sectional view of an upper burr assembly and bail.
Figure 11:
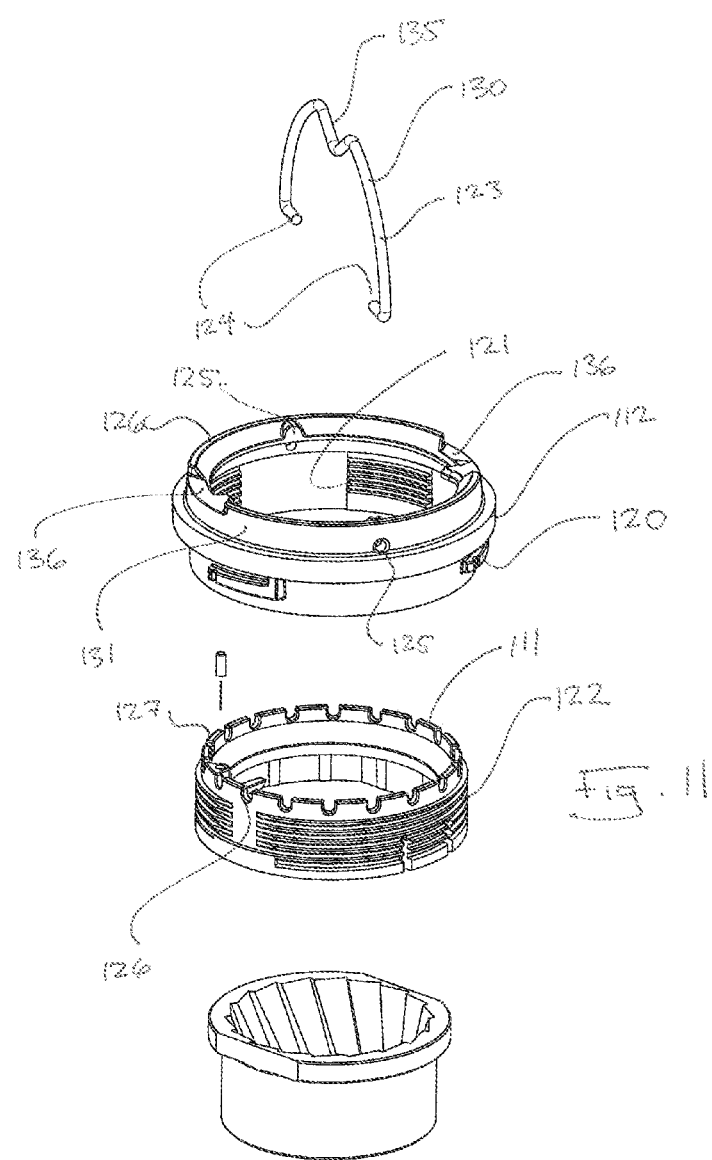
FIG. 11 is an exploded perspective view of the upper burr assembly shown in FIG. 10.

FIG. 10 illustrates the upper burr assembly, previously seen in FIG. 5. The upper burr assembly comprises the upper burr 110 and inner portion of the upper burr holder 111 and an outer portion of the upper burr holder 112. As suggested by FIG. 11, the outer portion 112 has external features such as bayonet features 120 that allow the outer portion to engage the upper burr carriage that retains it. The upper portion also have internal threads 121 that cooperate with external threads 122 formed around the sidewalls of the inner portion of the upper burr holder 111. The cooperating threads 121, 122 allow for rotational displacement of the inner portion relative to the outer portion.

The outer portion 112 carries a folding handle 123. In this example, the handle has opposing hands, each featuring an inwardly directed tip 124. The tips 124 are long enough to pass through a pair of openings 125 located opposite one another and near the upper rim 126 of the out portion 112. The tips 124, as seen in FIG. 10, also pass through recesses or scallops 126 that are equally spaced about the upper rim 127 of the inner portion 111. When the tips 124 of the handle 123 are fully inserted (as shown in FIG. 10) relative rotation between the inner and outer portions 111, 112 is prevented. In preferred embodiments, the handle 123 comprises a bail 130 located between the two tips 124. The bail conforms to the shape of a circumferential shoulder 131 toward the upper margin of the outer portion 112. The bail 130 has a reflex portion 135 that is received, when the bail is in its lower most or resting position, in one or the other of a pair of receiving recesses 136 formed on an upper periphery of the outer portion 112.

Figure 12:
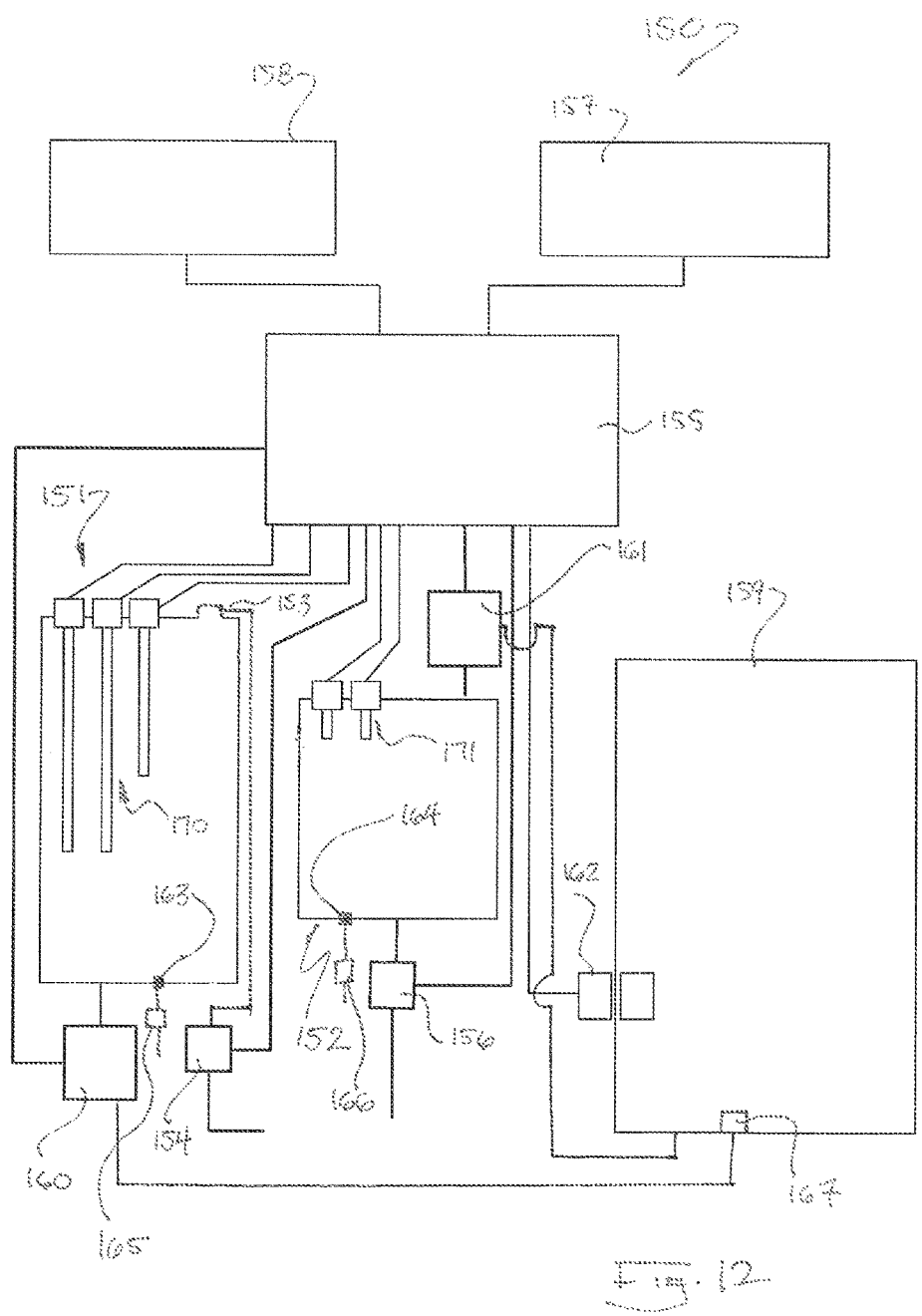
FIG. 12 is a schematic diagram illustrating an espresso making machine having internal boilers for both steam and water.

As shown in FIG. 12, an espresso coffee making machine 150 may have two internal boilers, one for steam 151 and one for hot water 152. Steam produced by the steam boiler exits via a port 153 and is discharged by the device's steam wand and the production of steamed beverages such as milk foams that are used in the production of latte and cappuccino etc. The steam discharge from the port 153 is controlled by an electromechanical or mechanical steam discharge valve 154. The valve is controlled by the device's micro processor control unit (MCU, PCB or processor) 155. The MCU 155 also controls the electromechanical water discharge valve 156 of the hot water or coffee boiler 152. A user interface 157 provides various switches, knobs, controllers, selectors or other input devices required for the user to control the operation of the espresso machine 150 by providing inputs and values to the MCU 155. User preferences, values, machine states, options and process parameters etc. may be displayed to the user via a graphic interface or display 158 that is driven or controlled by the MCU 155. A reservoir or water tank 159 supplies water to a pump 160 that supplies water to the steam boiler 151, the pump 160 being controlled by the MCU 155. A separate pump 161 pumps water from the water tank 159 into the coffee boiler 152. The coffee boiler's supply pump 161 is controlled by the MCU 155. The reservoir 159 may have a level sensing device 162 that provide information to the MCU 155 regarding the volume of water in the tank 159. In some embodiments, the tank is removable by the user for refilling.

In this example, both boilers 151, 152 are provided with a drain opening 163, 164 located at or closely adjacent to the lowest point within each boiler. The output of the drains 163, 164 are controlled by drain valves 165, 166. The drain valves 165, 166 may be electromechanical and thereby controlled by the MCU in response to a user input (or otherwise) or may be mechanical valves that are directly operated by the user. The purpose of the user operated valves 165, 166 is to allow the boilers to be drained completely during the scaling operations.

In preferred embodiments, the water tank 159 incorporates a user replaceable resin type filter 167. The MCU 155 provides the user with prompts at calculated intervals for both replacing the filter 167 and conducting descaling operations relating to one or both boilers 151, 152, independently or simultaneously.

A user uses the interface 157 to initiate a de-scale sequence. The user first empties the water tank 159 and when there is a filter, optionally and temporarily removes the water filter 167 from the tank 159. The tank is then replaced after having been filled with a de-scale solution of a kind well known in the art. The coffee machine's drip tray is removed, emptied and reinstalled. After this, the drain valves 165, 166 are either opened by the user or, if electromechanical valves are used, by the MCU 155. Water will then flow from the tanks into the coffee machine's drip tray. The valves 165, 166 are closed when water stops flowing into the drip tray or wherever the drained water is otherwise discharged. After both valves are closed, the user makes a selection on the interface 157 that causes the MCU 155 to proceed to the next step. The outputs of the steam boiler's level sensors 170 and the water boiler's level sensors 171 (or other means) are read by the MCU 155 to determine whether or not the boilers are empty. If one or both boilers are not empty, the machine will provide the user with a visual or audible warning indicating that the emptying process must be repeated or completed. When the boilers are actually empty, the MCU 155 will cause the supply pumps 160, 161 to fill each boiler. The boiler temperature may be adjusted to an optimum level for de-scaling. The MCU 155 will then initiate a countdown of a de-scale interval, in this example, about 20 minutes. When the boilers are filled with de-scale solution, the countdown timer will start and the countdown will be visually indicated or displayed on the machines graphic display 158. After the de-scale interval, the MCU 155 will show a countdown time of "zero" or otherwise prompt the user to open the drain valves 165, 166. If the drain valves are electromechanical, the MCU 155 may cause them to open without user intervention.

The valves 165, 166 are then closed after water stops flowing into the drip tray, whereupon the user enters another command via the interface 157 so that the MCU 155 can proceed to the next step. This will cause the MCU to fill the boilers with fresh water from the reservoir and initiate a new, preferably shorter, countdown. Any de-scale solution remaining in the boilers will dissolve into the fresh water. After a countdown of, say, five minutes, the user will be prompted to open the drain valves 165, 166. The MCU will perform this operation when electromechanical valves are used. The rinse cycle may be repeated, if required. After rinsing, the valves 165, 166 are closed and normal brewing operations can be re-commenced.

Figure 13:
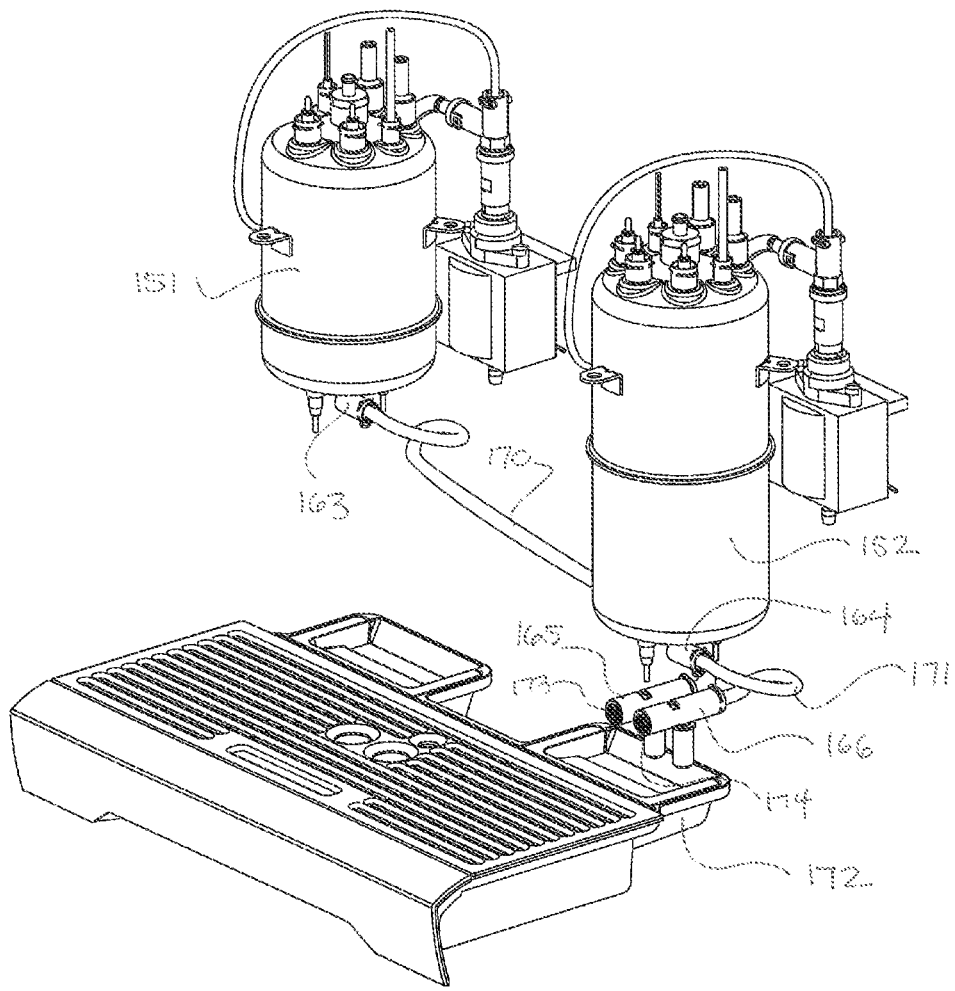
FIG. 13 is a perspective view illustrating the boilers in an espresso making machine, their drain valves and the removable drip tray.
Figure 14:
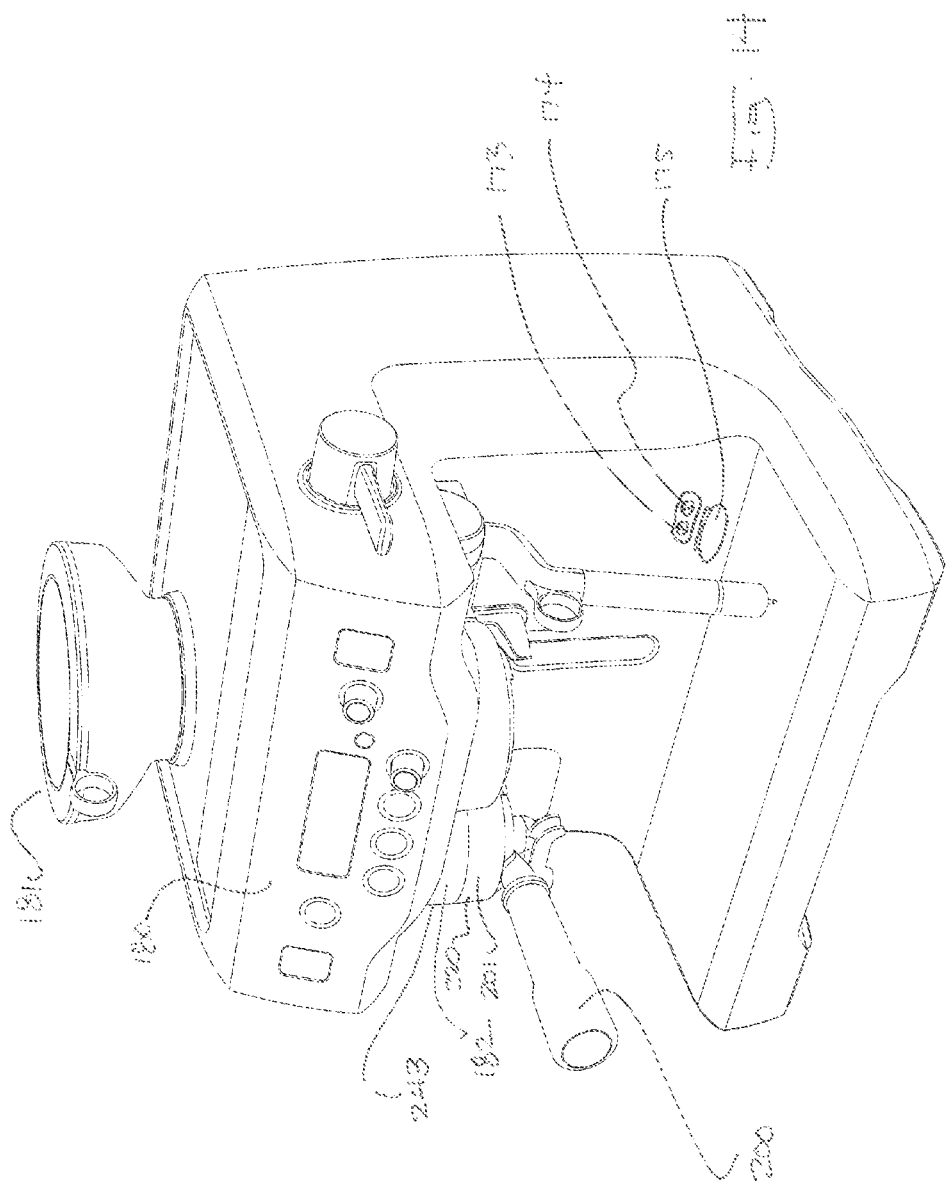
FIG. 14 is a perspective view of an espresso making machine incorporating an integral grinder and tamping augur, also illustrating user accessible drain valves.

As suggested by FIGS. 13 and 14, one or both boilers 151, 152 are provided with drain openings or ports 163, 164 that are located at a lowermost point of the interior of the boiler. The drain ports 163, 164 are connected to the drain valves 165, 166 by flexible or other tubes 170, 171 to the respective valves 165, 166. As illustrated, the drain valves 165, 166 discharge into the coffee machine's removable drip tray 172. As previously mentioned, the drain valves 165, 166 may be electromechanical or manually operable by the user. In this example, each drain valve 165, 166 has a threaded or rotating valve actuator or gate 173, 174 that is easily accessible by the user and preferably located on one of the front surfaces of the coffee machine 150. A protective or decorative cap 175 may be used to protect or cover the user accessible actuators 173, 174.

In particularly preferred embodiments, the device's MCU 155 calculates a recommended de-scale interval and provide the user with a visual prompt (on the display 158) regarding when a de-scale operation should be conducted. It is preferred that the de-scale interval be calculated with reference to the user's actual water hardness. Accordingly, the user may be supplied with water hardness test strips. In one example, the test strips provide five distinct levels or indications of water hardness using the test strips and the reading providing by them, the user enters an integer between 1 and 5 to the MCU 155 via the interface 158. In this example, the five levels of water hardness correspond to (from lowest to highest, 1-5) are: below 50 ppm $CaCo_3$, 50-120 ppm $CaCo_3$, 120-240 ppm $CaCo_3$, 240-360 ppm $CaCo_3$ and above 360 ppm $CaCo_3$.) A counter in the MCU keeps track of the number of operations performed by each boiler or the volume of water handled by each boiler when in use. The MCU can display an indication, such as an incremental numerical value on the display 158 separately, for replacement of the resin filter 167 and for when a de-scale operation is required in respect of either the steam boiler 151 or the coffee boiler 152, or both of them. In preferred embodiments, the MCU may establish a lower limit, being a minimum number of operations or volume of water processed before providing a prompt to the user regarding the need to perform a de-scale operation. In some embodiments 1500 coffee cycles need to be recorded by the MCU prior to the issuance of a graphic user prompt regarding de-scale.

A graphic user prompt generated by the MCU regarding de-scale can also be made on the basis of the degradation in performance of the electronic water level detectors 170, 171 in one or both boilers 151, 152. The build-up of scale on the probes of the level detectors 151, 152 results in increased resistance on the probes. The higher resistance results in a reduction in their performance and is recorded or detected by the MCU as a reduction in the voltage output reading that is otherwise used to detect the presence of water in the boiler. In this example, no voltage is recorded across the probes or pins of a water level indicator when a tank is empty and 1.9 volts is recorded when water is in contact with a pair of pins or probes in a water level indicator 170, 171. When the nominal indicated voltage drops from 1.9 volts to 1.7 volts, the MCU interprets this as sufficient degradation to provide the user with a de-scale prompt on the display 158, so long as other conditions such as the minimum volume or number of coffee cycles has been satisfied. Timely de-scaling operations will prevent the boilers and the probes associated with the water level indicators 170, 171 from failing.

In one example, the MCU 155 measures and records the volume of water handled by a boiler and uses this record of water volume as an additional way of prompting the user to perform a de-scaling operation. The generation of the user prompt for de-scaling may also take into account the state of the water tank's filter 167. For example, the MCU counter and any graphic display of it, can be changed or incremented, from an initial level, at two different rates, one being for when the filter is within its useful life, and a second higher rate after the nominal filter life has expired. In respect of the de-scale operation, a nominal counter upper limit may be established as an auditory value of 600. This value may be displayed to the user. The initial value is incremented (from zero) by a value of 3 for each 200 liters of water processed by the boiler. After the expiry of the nominal filter life, this same volume of 200 liters represents an increment in the counter by 6. The table below provides the increment applied by the MCU and displayed to the user for both the resin filter replacement and the de-scaling operations. The table is based on a nominal count-up from a value of 600 for the de-scale operation and a nominal value of 300 for the prompt for the water tank resin filter change. The exemplary water volume associated with each increment and the amount of the increment are shown in the table for both the filter change and the de-scale, for each of the five aforementioned water hardness levels.

| | Change Filter | | De-Scale | | |
|---|---|---|---|---|---|
| | | | | Counter/L | |
| Water Hardness | Volume (L) | Counter (per L) | Volume (L) | Within Filter Life (per L) | After Filter Life (per L) |
| 1 | 100 | 3 | 200 | 3 | 6 |
| 2 | 75 | 4 | 150 | 4 | 8 |
| 3 | 50 | 6 | 100 | 6 | 12 |
| 4 | 30 | 10 | 75 | 8 | 16 |
| 5 | 10 | 30 | 50 | 12 | 24 |

As shown in FIGS. 14-20, an espresso coffee making machine may incorporate an integral coffee grinder 180 with hopper 181, 182 and tamping augur for filling a portafilter 200 engaged with a fill head 201. The fill head 201 receives ground coffee from the grinder and discharges it into the portafilter. The fill head 201 also contains and orients the rotating tamping augur. The operation of both the grinder and augur can he controlled simply by manipulating the portafilter 200 that is in engagement with the fill head 201.

Figure 15:
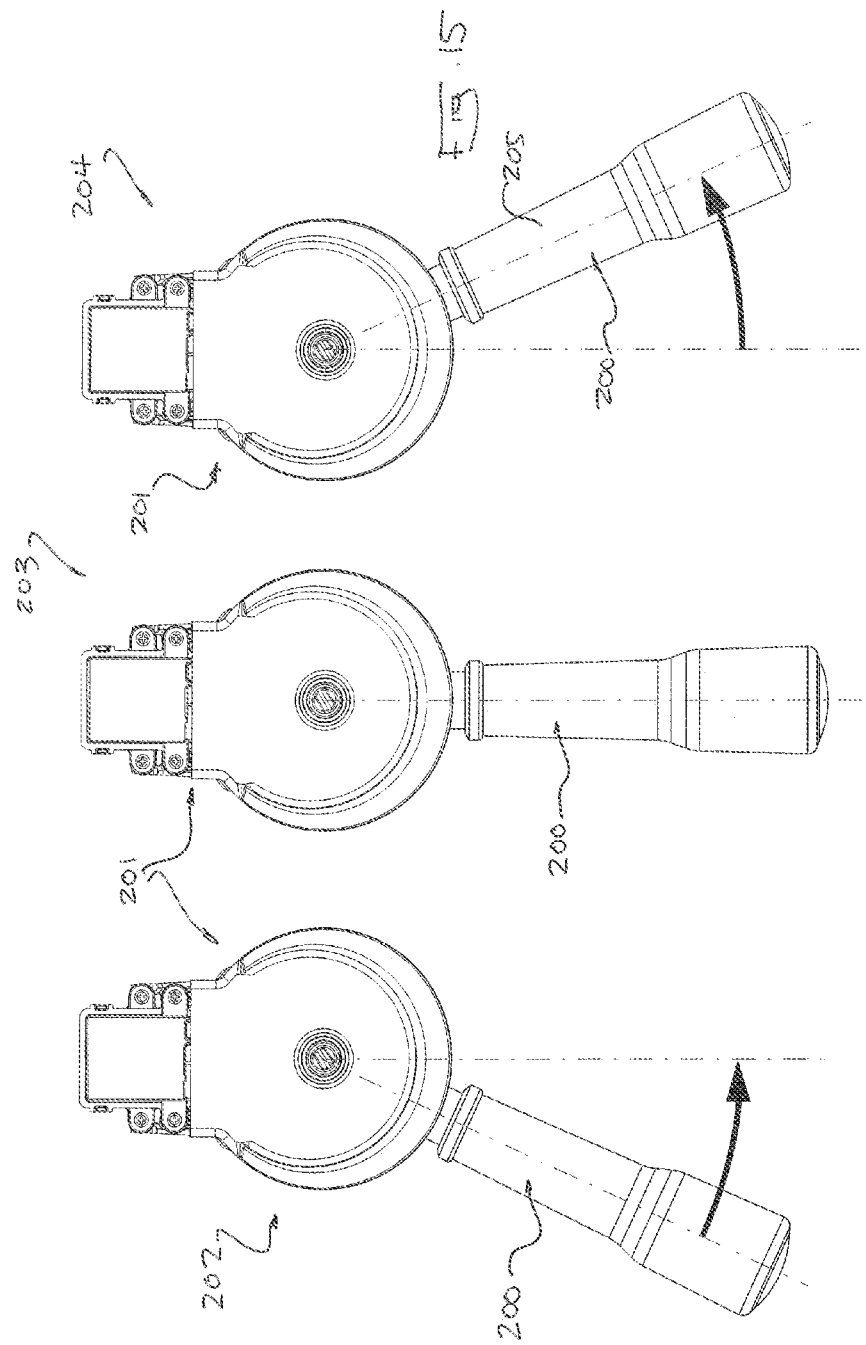
FIG. 15 illustrates the insert, home and start/stop positions of a portafilter with respect to a fill head that supports it.

As suggested by FIG. 15, the portafilter 200 has three main orientations with respect to the fill head 201. In the "insert" position 202 the portafilter 200 has just been fully elevated into position with the underside of the fill head 202 but has not been rotated relative to the fill head 201. As will he explained, the fill head 201 has a female bayonet assembly, being features 210 that cooperates with male bayonet features 228 normally associated with the portafilter 200. In the insert position, the female bayonet features receive the male features prior to rotation of the portafilter 200. In a "home" position 203 an initial or partial rotation of the portafilter 200 defeats a safety interlock, thus allowing for power to be supplied to the motors that operate both the coffee grinder and the tamping augur. In the home position 203, neither the coffee grinder's motor nor the tamping augur's motor are actually activated. In order to activate the grinder and augur motors, the portafilter 200 is rotated into a start/stop position 204. Both motors will be suitably controlled by the MCU 155 after being activated by rotating the portafilter 200 into the start/stop position 204. Both motors will be controlled by the MCU 155 so long as the portafilter is in the start/stop position 204 or the home position 203. In preferred embodiments, the female bayonet features 210 are biased so as to return the portafilter 200 to the home position if the portafilter's handle 205 is released. The portafilter 200 can only be inserted and removed when it is in the insert position 202.

Figure 16:
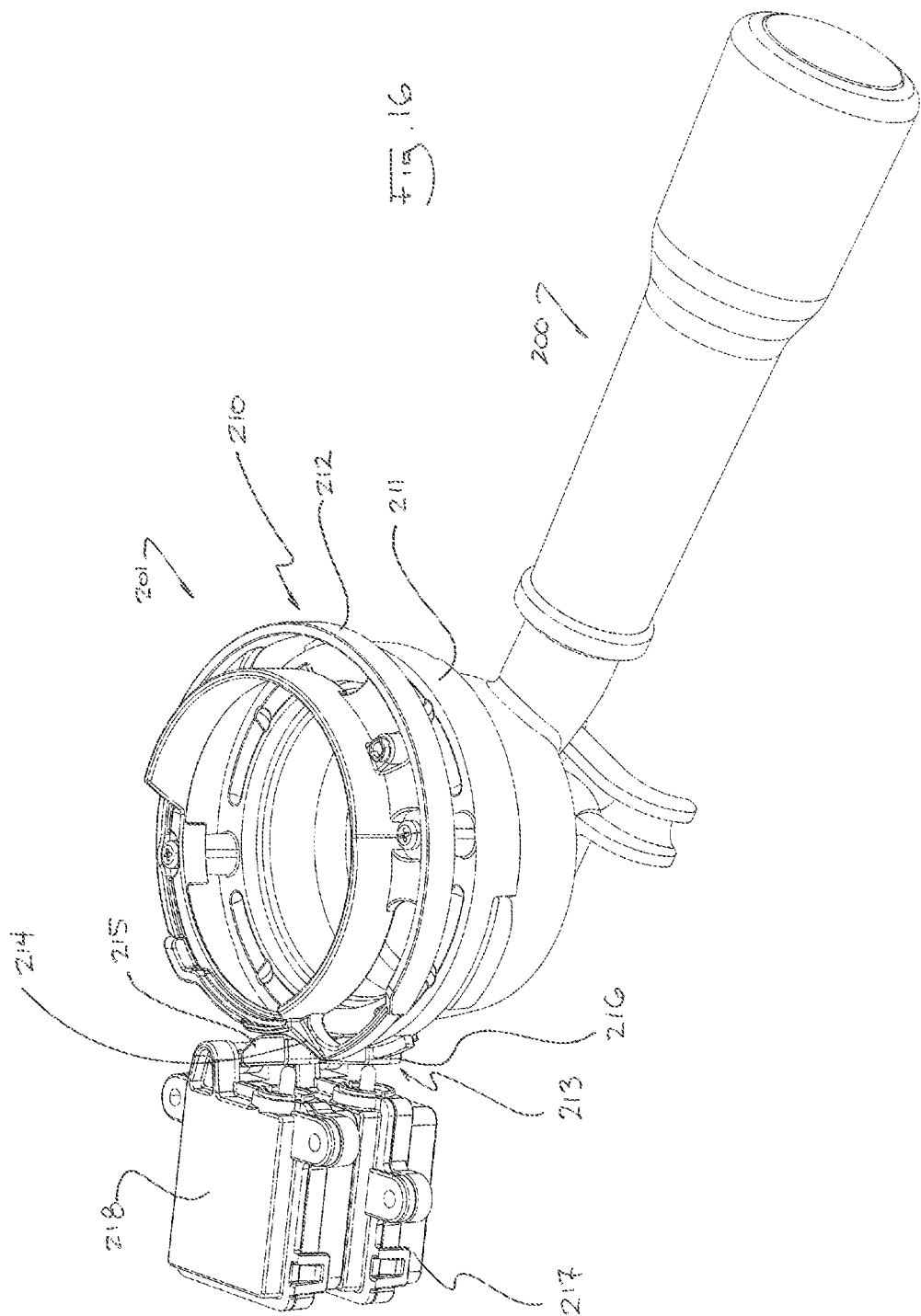
FIG. 16 is a perspective view of a portafilter and a mechanism for activating the grinding motor and tamping augur.

As shown in FIG. 16, the female bayonet features 210 of the fill head 201 include a pair of interconnected rings 211, 212. Each ring 211, 212 includes a cam surface 213, 214. Each cam surface cooperates with an optional cam follower 215, 216. Each cam follower is pivotally or otherwise attached to a micro switch 217, 218 or other electrical switch. Accordingly, rotation of the portafilter 200 causes a rotation of the rings 211, 212. Rotation of the rings, 211, 212 brings the cam surfaces 213, 214 into and out of engagement with the cam followers 215, 216. Thus, the two switches 217, 218 can be switched or activated independently in accordance with the position of the portafilter 202, 203, 204. FIG. 16 illustrates the insert position 202 in which the portafilter is inserted, but not rotated relative to the fill head 201. Neither of the switches 217, 218 is activated.

Figure 17:
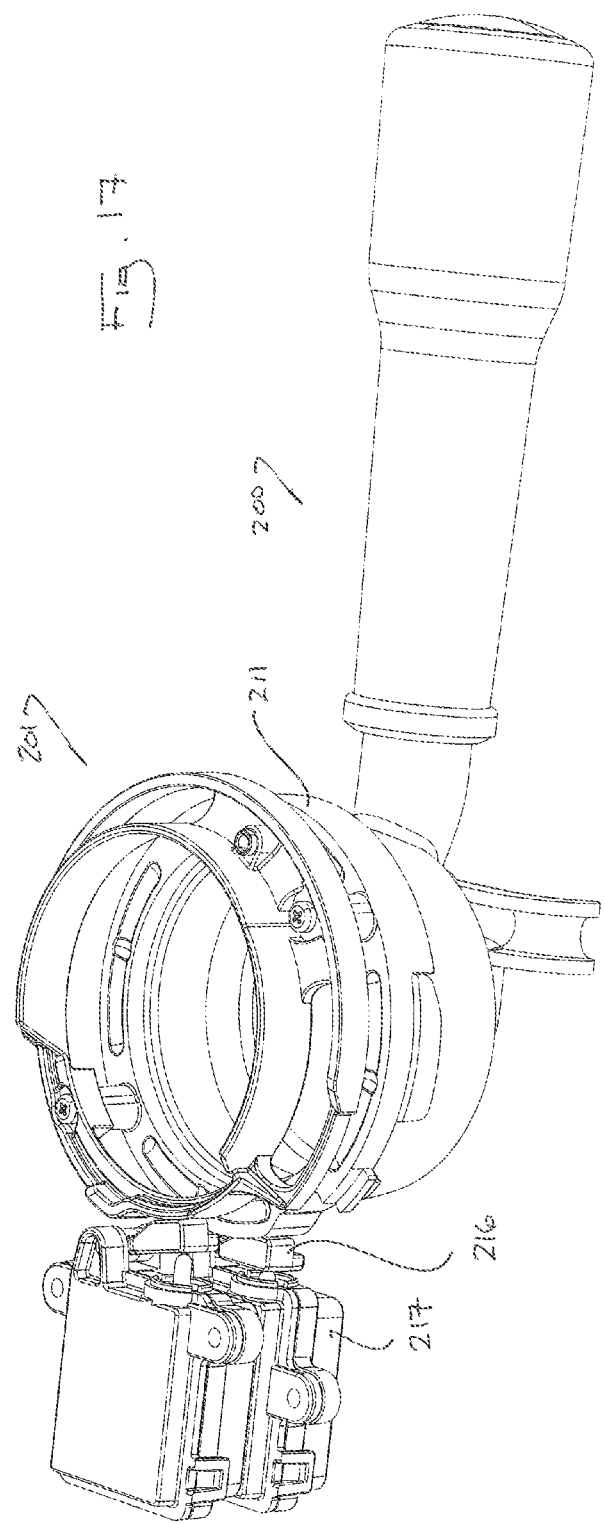
FIG. 17 is a perspective view of a portafilter and a mechanism for activating the grinding motor and tamping augur.

FIG. 17 illustrates the home position 203. In this orientation, the portafilter 201 has been rotated so that the cam surface 213 of the lower ring 211 acts to actuate the lower micro switch 217, in this example through the intermediate action of the lower cam follower 216. This action activates the circuits that allow the MCU to potentially control the operation of the grinder motor and augur motor.

Figure 18:
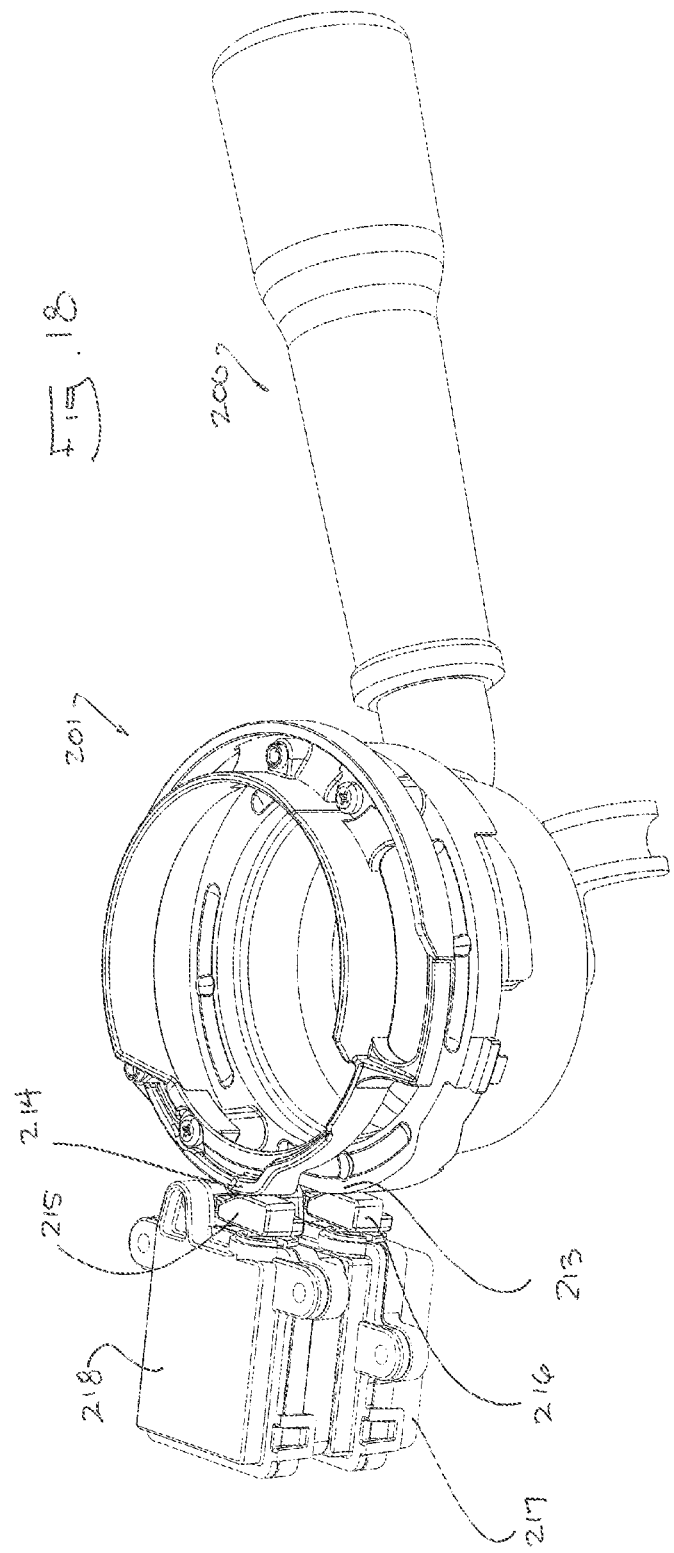
FIG. 18 is a perspective view of a portafilter and a mechanism for activating the grinding motor and tamping augur.

Further rotation of the portafilter 200 relative to the fill head 201 causes the portafilter 200 to enter the start/stop position 204 as shown in FIG. 18. In this orientation, both cam surfaces 213, 214 have displaced both cam followers 215, 216 and both switches 217, 218 have been tripped or activated. When safety switch 217 is activated and activation switch 218 is temporarily activated, the MCU is able to and does control the activity of the grinder motor and augur motor in accordance with a pre-established routine or instructions and preferences provided by the user through the interface 157.

Figure 19:
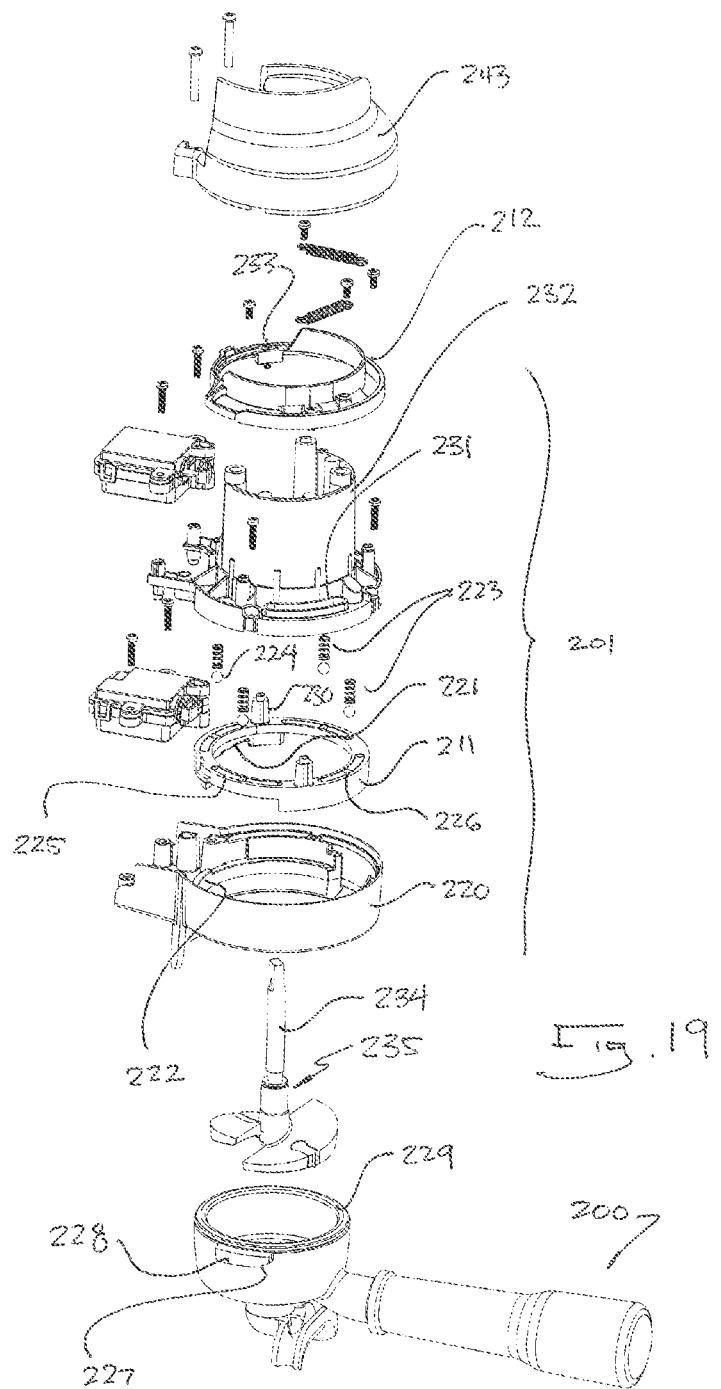
FIG. 19 is an exploded perspective view of an assembly for retaining a portafilter during the filling and tamping operations disclosed in the specification.

As shown in FIG. 19, the lower ring 211 is received by the engagement collar 220 of the fill head 201. The collar 220 is attached to a front surface of the coffee making machine. In preferred embodiments, the lower ring 211 is not free to rotate until the portafilter 200 is inserted and at least partially rotated. This is accomplished by providing the lower ring 211 with a anti-rotation step 221 formed on the lower rim of the lower ring 211. In the rest position, the step 221 engages with and cooperates with a second step 222 formed on the collar 220. In order that the steps 221, 222 be disengaged, the portafilter 200 is inserted into the collar 220 and partially rotated. A ramped under surface 227 associated with the portafilter's male bayonet features 228 causes the upper rim 229 of the portafilter to lift the lower ring 211 against the biased imposed by the ball and spring elements 223. When the steps 221, 222 are disengaged, the lower ring 211 can rotate relative to the collar 220. The lower ring 211 is biased downwardly by, in this example, four ball and spring detent elements 223. Each of the balls 224 cooperates with an arcuate track or groove 225 formed on an upper surface of the lower rim 211. Each track or groove 225 has a central detent 226 that works in cooperation with the ball and spring elements 223 to create haptic feedback and to assist in the maintenance of the portafilter 200 in the home position 203.

The lower ring 211 has two upright posts 230. The posts pass through arcuate through openings 231 formed on a collar 232 that acts as a mount for the motorised augur assembly. The upper ring 212 is preferably attached to the posts 230 of the lower ring 211 by fasteners 233. Thus, the upper and lower rings 211, 212 rotate in unison, the movement being limited by the ends of the slot 231. The sleeve 232 provides a journal or other hearing for receiving the rotating shaft 234 of the augur fan assembly 235.

Figure 20:
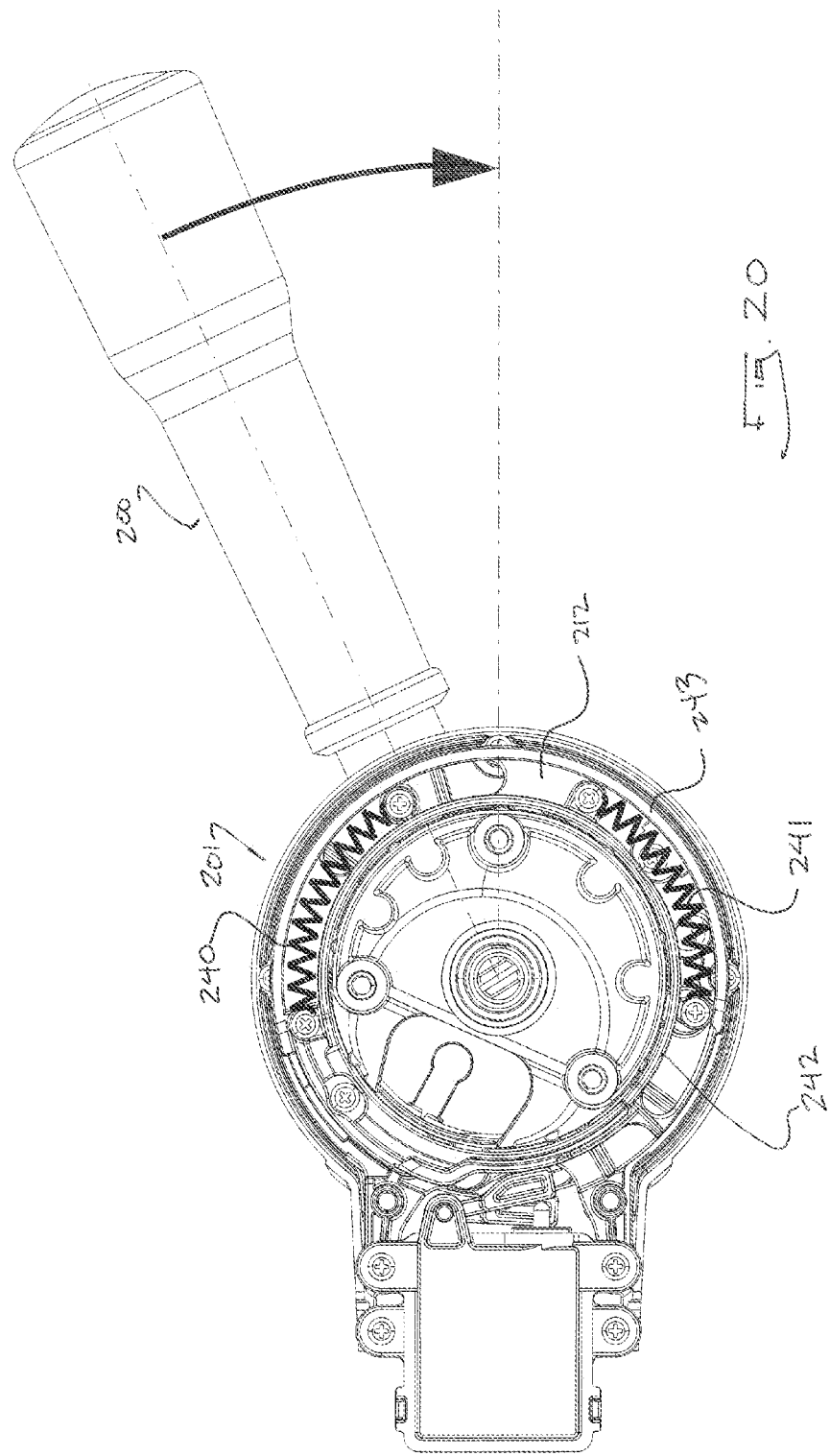
FIG. 20 is a plan view of a fill head and portafilter.

As shown in FIG. 20, the bias mechanism that returns the portafilter to the home position may comprise one or more (in this example two) tension or return springs 240, 241. In this example, each of the return springs is affixed, at one end, to the upper ring 212 and at an opposite end, to a static portion such as a part of the collar 232. Thus the springs 240, 241, curve to occupy the channel between the curved outer surface 242 of the upper ring 212 and the curved inner surface of the cover 243 of the fill head assembly 201. The springs 240, 241 are only elongated significantly with the portafilter 200 is between the home position 203 and the start/stop position 204.

Figure 21:
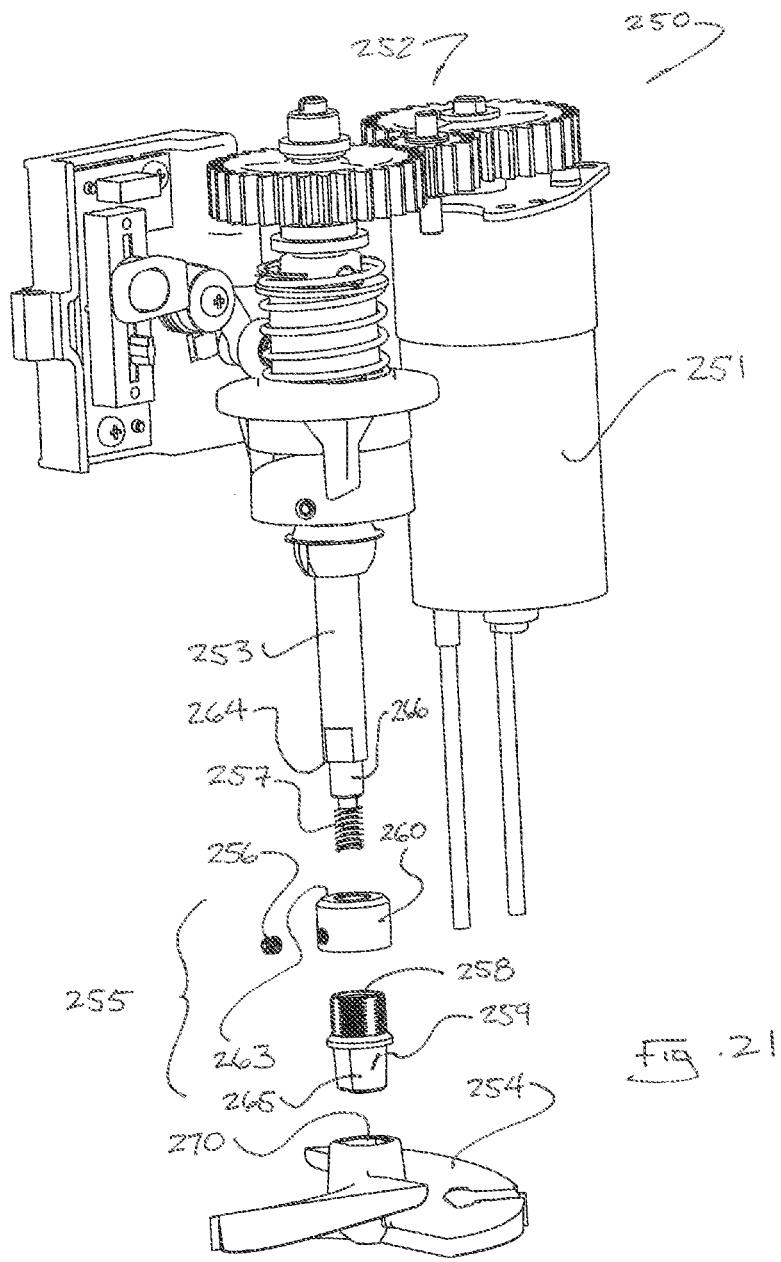
FIG. 21 is a perspective view of a motorised tamping augur with height adjustment mechanism.

As shown in FIG. 21, a motorised tamping augur 250 has an electric motor 251 that drives a power train or gearing assembly 252 which in turn drives the shaft 253 to which the augur fan 254 is directly or indirectly affixed. In this example, the vertical location or vertical height of the fan 254 is manually adjustable. The adjustment coupling and spacer 255 creates a threaded interconnection between the shaft 253 and the fan 254 that can be adjusted by a user and then fixed in its position relative to the fan or head with a radial set screw 256. In this example, the lower end of the shaft 253 is threaded 257. The threads 257 cooperate with female threads 258 that are formed along the interior bore of a coupling hub 259 (or directly in the head or fan). The directionality of the threaded interconnection between the shaft and the hub (or fan) 253, 259 is such that the threads are tightened as the augur is used. The hub 286 has an intermediate collar 292 for limiting the axial location of the fan 285. To prevent the hub 259 (and thus the fan) from advancing up the shaft and changing the vertical height of the fan 254, the coupling 255 is provided with a spacer 260 that cooperates with the hub 259. As shown in FIGS. 21 and 22 the spacer 260 has internal threads 261 that cooperate with external threads 262 formed around an exterior of the hub 259 (or the fan). After the augur fan vertical height is established by threading or unthreading the hub 259 (or fan) relative to the shaft 253 (using the threaded inner connection 258, 257) the spacer 260 is advanced toward the shaft 253. When the upper surface 263 of the spacer makes contact with a shoulder 264 located above the threads 257, the radial set screw 256 is tightened against the hub's external threads 262, thus immobilising the coupling 255 relative to the fan or head. The external threads 262 of the hub 259 may have flat areas 271 for better receiving the radial set screw 256 and thus the inner connection between the spacer 260 and the hub 259 (or fan). The spacer may be provided with a central opening 265 for receiving a reduced diameter portion 266 of the shaft 253. It will be appreciated that other forms of fan height adjustment are contemplated using a variety of threaded, frictional or other mechanical means.

A lower part of the augur fan hub 259 has one or more flats or features 265 and may he tapered to be inserted into and cooperate with a hub receiving opening or socket 270 formed centrally in the augur fan 254.

An alternate form of augur fan is shown in FIGS. 23-26. In order to better distribute the coffee grinds within the portafilter, such an augur fan wobbles or pivots about the vertical axis of the driving shaft 253 at any given augur fan height. In order to do so, the coupling 259 has, for example, a transverse through opening 281 that receives a pivot pin 282 that passes through one or more openings 283 in the area of the hub receiving socket 284 of the augur fan 285 thus creating a pivoting interconnection. The pivoting motion of the augur fan 285 is accommodated by a vertical slot 287 formed through a side wall of the hub receiving socket 284. A compression spring or other bias member 288 is located within a radial opening 289 formed in the hub and exerts a tilting force against the augur fan 285 as shown in FIGS. 24 and 25. When there is no load on the augur fan 285, the compression spring 288 will place the augur fan in an off-axis or tilted orientation shown in FIG. 25. When the level of coffee grinds rises within the portafilter, the grind will overcome the effect of the spring 288 and restore the augur fan to the horizontal or perpendicular condition shown in FIG. 24. Thus, the tamping and polishing process will be completed with the fan in a stable perpendicular orientation relative to the shaft 253. The amount of tilt or wobble of the fan 285 relative to the shaft 253 can be limited or adjustably limited by an abutment or vertical adjustment feature or screw 290. In this example, the tilt limiting screw 290 is received within a threaded opening 291 in the augur fan, adjacent to the central opening 292 that receives the hub 259. As shown in FIG. 25, the top of the adjustment screw 290 abuts the hub to establish a maximum extent of tilt or wobble. The wobble limiting feature 290 may be fixed, integral with the fan 285 or adjustable in the manner depicted in FIGS. 24 and 25.

Figure 26:
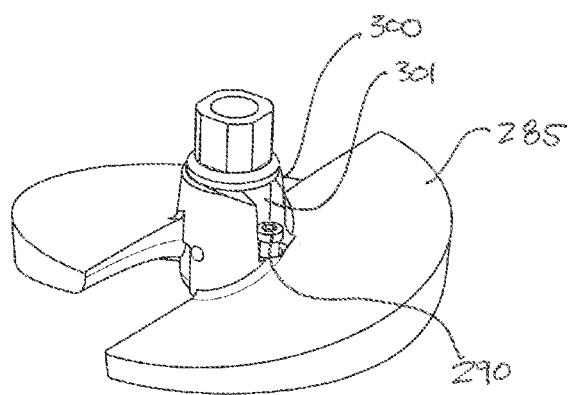
FIG. 26 is a perspective view of the augur fan shown in FIGS. 23-25.

As shown in FIG. 26, the female hub receiving portion 300 of the fan 285 may optionally include a vertical slot 287, 301 in the area of the tilt limited feature 290 so that the limiting feature or adjustment screw 290 can be accessed with the appropriate tool or driver, as required.

Figure 27:
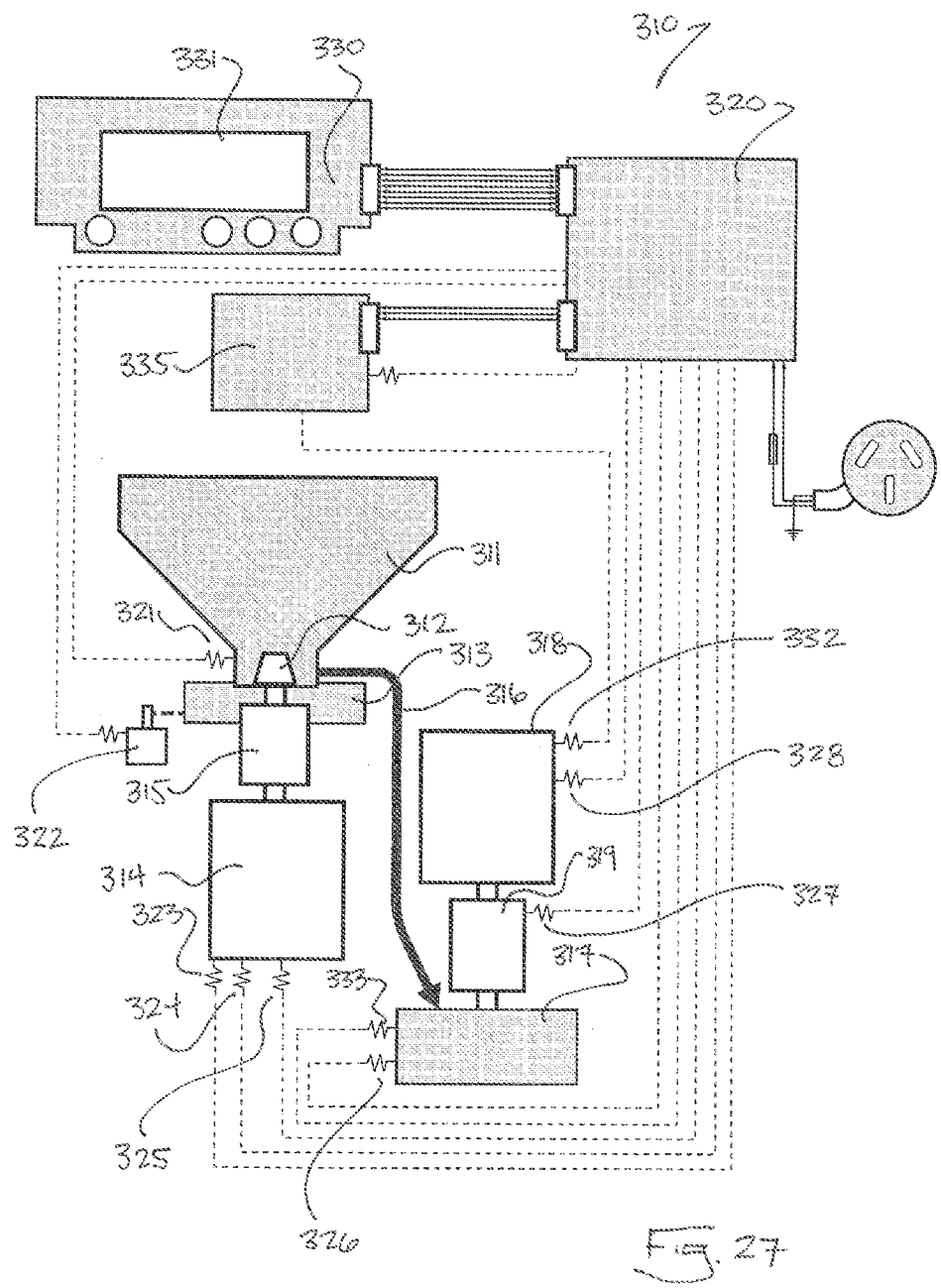
FIG. 27 is a schematic diagram of an espresso making machine having a hopper, grinder and augur.

FIG. 27 illustrates an espresso coffee machine 310 in schematic form. A device 310 of this type has the capability of operating the tamping augur, in different modes, to achieve optimal filling and compaction of the coffee within the portafilter. The coffee machine 310 comprises a bean hopper 311 for containing and dispensing beans into a grinder 312 having a grind adjustment mechanism 313 with, for example, an adjustable lower grinder burr, as is known in the art. The grinder is driven by an electric grinder motor 314 having, for example, a clutch engagement 315 with the grinder 312. Ground coffee is dispensed 316 above the tamper augur's fan. The augur is driven by a DC augur motor 318. An optional torque sensing tamp detector 319 may be interposed between the tamping augur 317 and the augur motor 318. The device's main control PCB (or MCU) 320 receives inputs from a hopper interlock sensor 321, the grind adjust position sensor 322, the grinder motor's thermostat, overheat detection sensor and motor speed sensor 323, 324 and 325. The PCB 320 also receives appropriate signals from the portafilter safety interlock sensor 326 the optional tamp detector torque sensor 327, the augur motor speed sensor 328 and other sensors and feedback devices as required. It will be appreciated that the aforementioned array of sensors may be deployed or not in accordance with the sophistication, complexity, cost and design parameters of the subject coffee machine 310. The PCB 320 also has a capacity to receive inputs and control the machine's user interface 330, its main graphic display 331, the power to the augur motor 332, the activation switch to the tamper augur 333, the power supplied to the grinder motor 314 and other controllable devices within the machine as required.

In order to better distribute coffee grounds within the portafilter, using the motorised tamper augur and augur fan suggested by FIG. 27 and as otherwise known in the art, a sequence of events or method 340 is practiced in accordance with FIG. 28. In the example of FIG. 28, uniform distribution of grounds is achieved by first using the PCB 320 to activate a grind and tamp cycle that involves rotation of the augur fan with the augur motor 318. The motorised tamp mechanism is activated, for example, four seconds and the PCB 320 receives feedback during this activation 341 to indicate whether or not the portafilter has been completely filled. The feedback to the PCB 320 can be either from the tamper torque sensor 327, or for example, by monitoring the load on the augur motor 318 using the power draw on the motor as an indication of the work performed by the motor, as will be explained. On the basis of the feedback received by the PCB 320 the PCB 320 makes a determination of whether or not the portafilter is filled 342. If the PCB 320 determines that the portafilter is filled then the grinder and tamper are deactivated and an indication is provided to the user that the cycle is completed and that the portafilter is full 343. If the PCB 320 determines that the portafilter is not filled, the coffee grinder 312 is activated and the tamping mechanism is rotated in a first direction, for example, clockwise, for a short duration, for example, 1.5 seconds 344. Subsequently, the grinder is either activated or maintained in activation and the tamper is operated at a slower speed for a short duration, say for example, one half second 345. After the tamper is slowed or stopped 345, the grinder is either activated or continues to activate as the tamper is activated in an opposite direction, say clockwise, for a second interval 346. The second interval may be the same as the first interval 344, say 1.5 seconds. After this, the grinder is stopped and the tamper is rotated in the first direction (e.g. clockwise) for an interval of, for example, about 4 seconds for the purpose of providing a flat surface on the dose in the portafilter, if the portafilter is full 347. This is referred to as a polishing step. At the end of the polishing step 347, the PCB 320 makes a determination as to whether or not the portafilter is full 348. This may be done in the same manner as the earlier coffee detection step 342. If the portafilter is not full, the grinder and tamper are activated again, in the first direction 344. The cycle is then repeated 345, 346, 347, 348 until the PCB 320 determines that the portafilter is full. If it is, the grinder and tamper are deactivated and an indication is provided to the user that the portafilter filling cycle is complete 343.

As previously mentioned, as an alternative to a tamper torque sensor 327 or a tamper height detection mechanism, the PCB 320 can use the augur motor's load or current draw to determine whether or not the portafilter is full and separately, when the surface has been polished. A tamper motor current sensor (335 in FIG. 27) cooperates with the augur motor 318 and provides load indicative signals to the PCB 320. The grind and tamp cycle is thus first activated by a user 360. The mechanism is run for, for example, four seconds and during this time, an indication (audible or visual or both) may be given to the user that the grinder and tamper status is active 361. When no coffee grinds are in contact with the augur fan, the tamper motor 318 draws the least current and is under the lowest load. As the ground coffee level within the portafilter rises, contact is eventually made within the augur fan. At this point, the motor load increases. The PCB 320 compares the motor load from the sensor, e.g. 335 to a pre-established first threshold value 362. The first or fill threshold is a load or current level of the augur's motor that indicates that the portafilter is full. The first threshold value may be variable and input from a user activated control on a user interface to the PCB. If the fill threshold has not been met the coffee grinder 312 is activated and a grinder timer is started 363. The tamper mechanism either remains activated or is activated as the grinder operates 363. The PCB 320 again compares the motor current or load signal from the load sensor 335 to a pre-established threshold value 364. If the motor current has not increased to the threshold value, the PCB 320 compares the duration of the current detection step 364 to a pre-established time value, for example, 60 seconds 365. If the duration of the current detection step 364 has not exceeded the threshold time value 365 the grinder and tamper continue to operate 366 until either the fill threshold has been reached 364 or the threshold time 365 has been exceeded. If either of these conditions are met, the grinder is stopped by the PCB while the tamper mechanism operates 366. Concurrently, a tamp timer associated with the PCB 320 is activated. The PCB 320 then compares the motor current or draw to a second or polish threshold 367 of lower value than the first threshold value. If the current is equal to or lower than the polish threshold the PCB determines whether or not the tamp timer has exceeded a pre-established value such as four seconds 369. If the pre-established time has been exceeded, the tamper is deactivated an optional indication is provided to the user that the grind and tamp cycle is completed 368. If the PCB determines that the polish time has not yet elapsed, the current comparison and timer comparison steps 367, 369 are repeated 370 until such time as either the polish threshold is reached or (optionally) the tamp timer has exceeded the pre-established duration whereupon the grinder and tamper are deactivated and an indication is provided to the user that the cycle is complete 368. It will he appreciated that a fine tuning of the system described in FIG. 29 may require a time constant to be added to current detection step 362, 367 in order that either the coffee grinder or the tamper operate for a pre-established time interval after a current threshold has been reached. It will also be appreciated that the method and apparatus relating to the detection of a full and polished portafilter disclosed with reference to FIG. 29 may be combined with the method and apparatus of coffee grinds distribution disclosed in FIG. 28.

Thus a first threshold current value indicates that the portafilter is full and the delivery of grinds may be halted. The second (and lower) threshold indicates that the motor is working less because the dose has been polished. The first threshold being reached causes the grinder to stop, but not the augur. The second threshold being reached causes the augur to stop. A time constant or interval may be added after either threshold is reached.

Although the technology has been described with reference to specific examples, it will be appreciated by those skilled in the art that the technology may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present technology. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the technology, various features of the technology are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed technology requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this technology.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller computer or computing system, or similar electronic computing device, that manipulates and/or transforms data.

Furthermore, while some embodiments described herein include some but not other features included in other embodiments, combinations of features of different embodiments are meant to be within the scope of the technology, and form different embodiments, as would be understood by those in the art. For example, in the following claims, any of the claimed embodiments can be used in any combination.

Thus, while there has been described what are believed to be the preferred embodiments of the technology, those skilled in the art will recognize that other and further modifications may be made thereto without departing from the spirit of the technology, and it is intended to claim all such changes and modifications as fall within the scope of the technology.

While the present technology has been disclosed with reference to particular details of construction, these should be understood as having been provided by way of example and not as limitations to the scope or spirit of the technology.

What is claimed is:

1. A device to grind and tamp comprising:
   a first electric motor;
   a second electric motor;
   an auger drivable by the first electric motor;
   a coffee grinder drivable by the second electric motor;
   a processor adapted to control the first electric motor and the second electric motor;
   and;
   a current sensor adapted to measure a current drawn by the first electric motor and provide a load signal, indicative of the current drawn by the first electric motor, to the processor;
   wherein the processor is adapted to perform a comparison of the current drawn by the first electric motor to a pre-established threshold value, control operation of the second electric motor based on the comparison, and stop the second electric motor if the current drawn by the first electric motor equals or exceeds the pre-established threshold value.

2. The device of claim 1, wherein, after the pre-established threshold value is reached,
   the processor is adapted to operate the first electric motor for a time interval before stopping the first electric motor.

3. The device of claim 1, wherein
   the auger is a fan having one or more tamping blades, and at least one of the tamping blades has a wiper comprising a lip that projects beyond an outer periphery of one of the tamping blades.

4. The device of claim 3, wherein the wiper is an elastomeric insert.

5. The device of claim 4, wherein the one of the tamping blades has a recess for retaining the elastomeric insert, and the elastomeric insert is retained in the recess by an enlarged head formed on the elastomeric insert.

6. The device of claim 1, wherein the auger is carried by a hub having a threaded interconnection to a shaft that is driveable by the first electric motor, and including a spacer located between the hub and a shoulder formed on the shaft.

7. The device of claim 6, wherein
   the hub has internal threads that cooperate with an external thread on the shaft, and the hub has external threads that cooperate with the spacer.

8. The device of claim 7, wherein the spacer has a set-screw for immobilizing the spacer relative to the hub.

9. The device of claim 1, wherein the auger is carried by a threaded interconnection to a shaft that is drivable by the first electric motor, and including a spacer located between the auger and a shoulder formed on the shaft.

10. The device of claim 1, wherein
    the coffee grinder is adapted to deposit coffee grinds above the auger.

11. The device of claim 10, wherein the processor is further adapted to stop the second electric motor before stopping the first electric motor.

12. The device of claim 1, further comprising a user operated control adapted to provide the pre-established threshold value to the processor.

13. The device of claim 1, wherein the processor is further adapted to operate the second electric motor if the current drawn by the first electric motor is less than the pre-established threshold value.

* * * * *